US00RE40910E

(19) United States
(12) Reissued Patent
Aoki et al.

(10) Patent Number: US RE40,910 E
(45) Date of Reissued Patent: Sep. 8, 2009

(54) MOBILE COMMUNICATION TERMINAL EQUIPMENT USABLE FOR BOTH SATELLITE AND TERRESTRIAL COMMUNICATIONS

(75) Inventors: Katsuhiko Aoki, Hyogo (JP); Makio Tsuchiya, Hyogo (JP); Seiya Inoue, Hyogo (JP)

(73) Assignee: Mitsubishi Denki Kabushiki Kaisha, Tokyo (JP)

(21) Appl. No.: 09/112,020
(22) Filed: Jul. 8, 1998

Related U.S. Patent Documents

Reissue of:
(64) Patent No.: 5,535,430
Issued: Jul. 9, 1996
Appl. No.: 08/208,707
Filed: Mar. 11, 1994

(30) Foreign Application Priority Data

Mar. 18, 1993 (JP) ..... 5-058612

(51) Int. Cl.
*H04M 1/00* (2006.01)
*H04B 7/185* (2006.01)
*H04B 15/00* (2006.01)

(52) U.S. Cl. ..... 455/552.1; 455/12.1; 455/62; 455/557

(58) Field of Classification Search ..... 455/12.1, 455/13.1, 62, 427, 428, 552.1, 553.1, 563, 455/575.1, 575.9, 90.3, 344, 345, 556.1, 455/557

See application file for complete search history.

(56) References Cited

U.S. PATENT DOCUMENTS 4,873,711 A * 10/1989 Roberts et al. ..... 455/412
4,989,230 A 1/1991 Gillig et al.
5,175,872 A * 12/1992 Borras ..... 455/426
5,179,360 A * 1/1993 Suzuki ..... 455/83
5,187,809 A * 2/1993 Rich et al. ..... 455/571
5,303,286 A * 4/1994 Wiedeman ..... 455/12.1
5,303,393 A * 4/1994 Noreen et al. ..... 455/12.1
5,327,572 A * 7/1994 Freeburg ..... 455/427
5,369,803 A * 11/1994 Hirasawa et al. ..... 455/571
5,533,097 A * 7/1996 Crane et al. ..... 455/552

FOREIGN PATENT DOCUMENTS

CA 2073336 9/1991
JP 4123534 4/1992

OTHER PUBLICATIONS

Del Re, "An Integrated Satellite–Cellular Land Mobile System for Europe", Sep. 1989.*
"Cellular System Dual–Mode Mobile Station–Base Station Compatibility Standard", EIA/TIA Interim Standard, Telecommunications Industry Association, pp. 257–274, Apr. 1992.*
"Intelsat TDMA/DSI System Specifications", (TDMA/DSI Traffic Terminals) IESS–307 Rev. B, Mar. 12, 1991.*

* cited by examiner

*Primary Examiner*—Quochien B Vuong
(74) *Attorney, Agent, or Firm*—Rothwell, Figg, Ernst & Manbeck

(57) ABSTRACT

A mobile communication terminal equipment is mounted in a vehicle and can utilize both the satellite and terrestrial communication systems. The mobile communication terminal equipment includes a satellite transceiver and a portable set. The satellite transceiver has a satellite transmission/reception circuit. As required, the portable set is disconnected from the satellite transceiver to be carried by the user. The portable set includes a terrestrial transmission/reception circuit, a signal input/output circuit and a connection selecting switch. The connection selecting switch is automatically controlled to connect the signal input/output circuit selectively to one of the satellite and terrestrial transmission/reception circuits. When the satellite transmission/reception circuit is in connection with the signal input/output circuit, the communication through the satellite wireless communication system can be carried out. When the terrestrial transmission/reception circuit is connected to the signal input/output circuit, the communication through the terrestrial wireless communication system can be carried out.

26 Claims, 24 Drawing Sheets

MOBILE COMMUNICATION TERMINAL EQUIPMENT USABLE FOR BOTH SATELLITE AND TERRESTRIAL COMMUNICATIONS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a mobile communication terminal equipment mountable in automobiles and other vehicles.

2. Description of the Prior Art

A variety of mobile communication systems have been developed. The middle communication systems can be roughly classified into satellite and terrestrial mobile communication systems.

The satellite mobile communication system is one that performs the communication among a plurality of mobile stations through an artificial satellite (and a ground base station). The satellite mobile communication system is usually organized by mobile stations mounted on various vehicles, a base station located on the ground (ground station) and an artificial satellite for wirelessly connecting the mobile stations and the base station. As such a communication system, there are known, for example, a system regulated by INMARSAT Standard M and a system INTELSAT TDMA/DSI (Time Division Multiple Access/Digital Speech Interpolation). Since almost all of the satellite mobile communication systems being currently used or planned utilize digital communication, coded voice signals, digital data and other digital signals will be handled in transmission and reception. The INTELSAT TDMA/DSI system is regulated in "Intelsat TDMA/DSI System Specification IESS-307-Rev. B", Mar. 12, 1991.

The terrestrial mobile communication is one that can make the communication among a plurality of mobile stations through a ground base station and that is usually organized by mobile stations mounted in a variety of movers and base stations located on the ground. A typical terrestrial mobile communication system is a cellular system. The cellular system comprises a plurality of base stations which are arranged on the ground in a regular pattern. Each of the base stations covers a region having a given area (e.g., a circular region having a radius ranging between a few kilometers and 10 kilometers and usually being called a "cell"). Each of the base stations uses a radio frequency different from those of the other base stations covering cells which are adjacent to the first-mentioned cell. Such a system may use the minimum number of radio frequencies and more effectively utilizes the frequency resource. A typical cellular system is an automobile phone system. The cellular systems currently used are mainly of analog type, but may be shifted to digital type in the near future. A typical analog type cellular system is shown in "Cellular Mobile Telephone Equipment Specification", May 1983, Advanced Mobile Phone Service, Inc. while a typical digital type cellular system is described in "EIA/TIA Project Number 2398", Cellular System Dual-Mode Mobile Station-Base Station Compatibility Standard IS-54-B Revision B, Jan. 25, 1991.

The cellular system has a disadvantage in that it cannot be used in some areas or regions. For economy, there are areas or regions which do not have any base station and so do not belong to any cells. For example, a base station will not be provided in a country area having a low population density, a mountainous district or a depopulated area. In such an area or region, it is difficult or impossible to utilize the cellular system.

One method of overcoming such a problem is to mount a mobile station for cellular system with a mobile station for satellite mobile communication system in a single vehicle. If the vehicle runs in an area or region in which the cellular system can be utilized (generally, in an urban area), a user (or operator) in the vehicle can select either of the cellular or satellite mobile communication system as required. In an area or region which does not belong to any cell in the cellular system, the user cannot utilize the cellular system, but can select and use the satellite mobile communication system.

However, the provision of both the cellular and satellite mobile stations in a single vehicle results in an increased scale of the entire system.

SUMMARY OF THE INVENTION

It is therefore a first object of the invention to enable the continuation of communication even in an area or region which does not belong to any cell in the cellular system.

A second object of the invention is to reduce the entire system in size.

A third object is to make a part of the mobile station portable.

A fourth object is to suppress the heat value produced by the mobile station.

A fifth object is to relax restrictions relating to a place at which the mobile station is mounted in the vehicle.

A sixth object is to enable various configurations of communication.

A seventh object is to realize a more automated mobile station.

A eighth object is to enable the automatic selection of an antenna which can perform a more preferred reception.

A ninth object is to enable the preferred execution of alternating between the satellite mobile communication system and the terrestrial mobile communication system.

In a first aspect, the present invention provides a mobile communication terminal equipment mountable in an automobile or other vehicle, comprising:

a) a satellite transceiver for transmitting and receiving signals through a satellite wireless communication system;

b) a terrestrial transceiver for transmitting and receiving signals through a terrestrial wireless communication system;

c) an input/output device for inputting signals from a user and for outputting signals to the user; and d) a connection switching means for selectively connecting the input/output device to one of said satellite and terrestrial transceivers.

In the first aspect, the input/output device is selectively connected to one of the satellite and terrestrial transceivers. Signals from the user through the input/output device are inputted into one of the satellite and terrestrial transceivers which is connected to the input/output device. Signals received by the transceiver which is connected to the input/output device are supplied to the input/output device from which the signals are outputted to the user.

For example, when the satellite transceiver is connected to the input/output device, the signals inputted by the input/ output device are sent to the other device (e.g., a mobile communication terminal equipment according to one of aspects of the present invention) and the signals transmitted from the other device are received by the satellite transceiver through the satellite wireless communication system. The satellite transceiver then provides the received signals to the input/output device.

When the terrestrial transceiver is connected to the input/output device, the signals inputted by the input/output device are transmitted from the terrestrial transceiver to the other device through the terrestrial wireless communication system. The signals transmitted from the other device are received by the terrestrial transceiver through the terrestrial wireless communication system. The terrestrial transceiver then sends the received signals to the input/output device.

When such a terminal equipment is mounted in a vehicle as a mobile station, the communication can be continued even in an area or region which would not be benefited from the communication system of the prior art. If the terrestrial wireless communication system is a cellular system, the satellite wireless communication system can be utilized to continue the communication even in an area or region which does not belong to any cell in the cellular system. The mobile communication terminal equipment of the present invention can be reduced in size and suppress the heat value in the mobile station since the input/output device is shared by the transceivers, in comparison with the case in which both the mobile stations for the satellite and terrestrial wireless communication systems are mounted in the same vehicle.

In a second aspect, the present invention provides a mobile communication terminal equipment mountable in an automobile or other vehicle, comprising:

a) a satellite transceiver including a satellite transmission/reception circuit for transmitting and receiving signals through a satellite wireless communication system; and b) a portable set disconnectable from the satellite transceiver so that the set can be carried by a user, said portable set comprising:

b1) a terrestrial transmission/reception circuit for transmitting and receiving signals through a terrestrial wireless communication system;

b2) a signal input/output circuit for inputting signals from the user and for outputting signals to the user; and b3) a connection switching means for selectively connecting the signal input/output circuit to one of the satellite and terrestrial transmission/reception circuits.

In the second aspect, the signal input/output circuit is selectively connected to one of the satellite and terrestrial transmission/reception circuits by the connection switching means. Signals inputted from the user through the signal input/output circuit are inputted into one of the satellite and terrestrial transmission/reception circuits that is connected to the signal input/output circuit. When signals are received by one of the satellite and terrestrial transmission/reception circuits that is connected to the signal input/output circuit, these signals are then supplied to the signal input/output circuit from which they are outputted to the user.

In the second aspect, similarly, the communication can be continued even through an area or region which would not be benefited from the communication system of the prior art. According to the second aspect, the satellite transceiver can be reduced in size with its heat value being suppressed, since the terrestrial transmission/reception circuit is disposed within the portable set, unlike the first aspect of the present invention. The reduction of size makes it possible to reduce the restrictions on the place at which the mobile station is mounted in the vehicle. The mobile station may be located adjacent to the driver's seat, for example.

According to the second aspect, further, the user can carry the portable set by separating it from the satellite transceiver. The portable set can be used as a mobile station for the terrestrial wireless communication system at a position remote from the vehicle.

In a third aspect, the present invention provides a mobile communication system comprising:

a) a plurality of communication terminal equipments, a first group of the equipments having a satellite wireless mobile station function of wirelessly transmitting signals to and receiving signals from a satellite base station through a satellite communication network, a second group of the equipments having a terrestrial wireless mobile station function of wirelessly transmitting signals to and receiving signals from a terrestrial base station through a terrestrial wireless communication network, a third group of the equipments having a wire terminal function of wire transmitting signals to and receiving signals from an other wire communication terminal equipment through a wire communication network, at least one of said communication terminal equipments being a mobile communication terminal equipment constructed according to the second aspect of the present invention and mounted in an automobile or other vehicle;

b) said satellite communication network interposing in the wireless transmission/reception of signals between respective one of the equipments belonging to the first group and the satellite base station;

c) said satellite base station for performing the wireless transmission/reception of signals relative to respective one of the equipments belonging to the second group through the satellite communication network and also for performing a wire transmission/reception of signals relative to the respective one of the equipments belonging to the third group and the terrestrial base station through the wire communication network;

d) said terrestrial wireless communication network interposing in the wireless transmission/reception of signals between a respective one of the equipments belonging to the second group and the terrestrial base station;

e) said terrestrial base station for performing the wireless transmission/reception of signals relative to a respective one of the equipments belonging to the second group and also for performing a wire transmission/reception of signals relative to the respective one of the equipments belonging to the third group and the satellite base station through the wire communication network; and f) said wire communication network interposing in transmission/reception of signals among the equipments belonging to the third group, the satellite base station and the terrestrial base station.

According to the third aspect, a variety of configurations communication channels can be provided. This means that the third aspect provides a great variety of applications to the mobile communication terminal equipment constructed according to the second aspect of the present invention. Such communication channel configurations may be as follows:

a) Communication terminal equipment having the satellite wireless mobile station function <--> satellite wireless communication network <--> satellite base station <--> satellite wireless communication network <--> another communication terminal equipment having the satellite wireless mobile station function.

c) Communication terminal equipment having the satellite wireless mobile station function <--> satellite wireless communication network <--> satellite base station <--> wire communication network <--> terrestrial base station <--> terrestrial wireless communication network <--> communication terminal equipment having the terrestrial wireless mobile station function.

c) Communication terminal equipment having the satellite wireless mobile station function <--> satellite wireless communication network <--> satellite base station <--> wire communication network <--> satellite base station <--> wire communication network <--> communication terminal equipment having the wire terminal function.

d) Communication terminal equipment having the terrestrial wireless mobile station function <--> terrestrial wireless communication network <--> terrestrial base station <--> terrestrial wireless communication network <--> another communication terminal equipment having the terrestrial wireless mobile station function.

e) Communication terminal equipment having the terrestrial wireless mobile station function <--> terrestrial wireless communication network <--> terrestrial base station <--> wire communication network <--> other terrestrial base station <--> terrestrial wireless communication network <--> communication terminal equipment having the terrestrial wireless mobile station function.

f) Communication terminal equipment having the terrestrial wireless mobile station function <--> terrestrial wireless communication network <--> terrestrial base station <--> wire communication network <--> communication terminal equipment having the wire terminal function.

g) Communication terminal equipment having the wire terminal function <--> wire communication network <--> another communication terminal equipment having the wire terminal function.

In the third aspect, at least one of the communication terminal equipments is a mobile communication terminal equipment constructed according to the second aspect of the present invention. Therefore, the third aspect also provides the same advantages provided by the second aspect.

The mobile communication terminal equipment according to the second aspect of the present invention includes a portable set having the terrestrial wireless mobile station function. Therefore, the aforementioned channel configurations b) and d)–f) can be realized even when the rotatable set is disconnected from the satellite transceiver. When the portable set is separated from the satellite transceiver, the user can perform the terrestrial mobile communication at a location remote from the vehicle (e.g., automobile).

According to the third aspect of the present invention, thus, the communication system can have a great variety of communication channel configurations since at least one of the communication terminal equipments defining the communication system is the mobile communication terminal equipment according to the second aspect of the present invention.

According to the second aspect of the present invention, further, the mobile communication terminal equipment can be constructed to perform the automated selection of a communication system to be utilized in response to the user's command. Thus, the mobile communication terminal equipment can more easily be used.

When such an arrangement is to be provided, the mobile communication terminal equipment requires a control key and its controller or command input means which can be operated by the user. The user can input various commands into the mobile communication terminal equipment through the command input means. Such commands include a command relating to the operation of the satellite transmission/reception circuit, a command relating to the operation of the terrestrial transmission/reception circuit, a command relating to the operation of the connection switching means and other commands. Particularly, the command relating to the connection switching means may include a command of selecting one of the satellite and terrestrial transmission/reception circuits when it is to be connected to the signal input/output circuit.

The automated selection of a communication system to be utilized in response to the user's command further requires the control of the connection switching means through terrestrial and satellite control means. For example, when a switching command of selecting and specifying the satellite transmission/reception circuit to be connected to the signal input/output circuit is given by the user, the terrestrial control means controls the connection switching means so that the satellite transmission/reception circuit will be connected to the signal input/output circuit. When a switching command of selecting and specifying the terrestrial transmission/reception circuit to be connected to the signal input/output circuit is given the satellite control means controls the connection switching means so that the terrestrial transmission/reception circuit will be connected to the signal input/output circuit.

The connection switching means may be composed of two switches. The first switch is used, in the transmission mode, to select one of the satellite and terrestrial transmission/reception circuits to be supplied with signals from the signal input/output circuit and in the reception mode, to select one of the satellite and terrestrial transmission/reception circuits to provide signals to the signal input/output circuit. The second switch is used to switch the control signal sending channel from one of the first channel connecting between the satellite control means and the signal input/output circuit and the second channel connecting between the terrestrial control means and the signal input/output circuit to the other.

The control signals carry information such as signal reception state at the satellite transmission/reception circuit, signal reception state at the terrestrial transmission/reception circuit, operation state of the connection switching means, commands from the command input means and others. These signals are transmitted and received among the satellite control means, terrestrial control means and signal input/output circuit. The satellite and terrestrial control means are responsive to control signals to control the operation of the signal input/output circuit when the corresponding one of the transmission/reception circuits is connected to the signal input/output circuit. Information provided by the control signals and control means can be visually displayed to be interpreted by the user. Information to be displayed may include the operation state of the satellite transmission/reception circuit, the signal reception state at the satellite transmission/reception circuit, the operation state of the terrestrial transmission/reception circuit, the signal reception state at the terrestrial transmission/reception circuit, the operation state of the connection switching means, the signal input/output state at the signal input/output circuit and others.

The transfer of control signals can be utilized to realize the selection of an antenna to be used and/or the alternating between systems.

In the present invention, three different types of antennas can be used:

a) a satellite communication antenna fixedly mounted on the vehicle to perform the wireless signal transmission/reception between the communication terminal equipment and the artificial satellite;

b) a portable terrestrial communication antenna fixedly mounted on the portable set to perform the wireless signal transmission/reception relative to the base station of the terrestrial wireless communication system; and c) a stationary terrestrial communication antenna fixedly mounded on the vehicle to perform the wireless signal transmission/reception relative to the base station of the terrestrial wireless communication system.

When it is wanted to perform the signal transmission/reception through the satellite wireless communication system, the satellite communication antenna is selected from among the different antennas and used. More particularly, when it is desired to utilize the satellite wireless communication system, the connection switching means is first manually or automatically controlled to connect the satellite transmission/reception circuit to the signal input/output circuit. In the signal transmission mode, the satellite control means mounded in the satellite transceiver first provides signals from the signal input/output circuit to the satellite transmission/reception circuit. The satellite transmission/reception circuit processes the signals in a predetermined manner, the processed signals being then supplied to the satellite communication antenna. The signals are transmitted from the satellite communication antenna toward the artificial satellite. On the contrary, the signal reception mode causes the satellite communication antenna to receive signals from the artificial satellite. The satellite transmission/reception circuit receives the signals from the satellite communication antenna. The satellite transmission/reception circuit processes these signals in the predetermined manner, the processed signals being then supplied to the signal input/output circuit. The signal input/output circuit outputs the signals to the user.

When it is wanted to perform the signal transmission/reception through the terrestrial wireless communication system, the portable or stationary terrestrial communication antenna is selected and used. Particularly, when the portable set is separated from the satellite transceiver and carried by the user or when there is no stationary terrestrial communication antenna, the portable terrestrial communication antenna must be used. Even if the stationary terrestrial communication antenna is not provided, the portability that is an important advantage of the present invention will not be damaged in any way. Therefore, the stationary terrestrial communication antenna is dispensable. When the portable set is connected to the satellite transceiver, the stationary terrestrial communication antenna can be used. In such a case, the portable terrestrial communication antenna cannot be expected to provide an excellent reception, but the stationary terrestrial communication antenna can more effectively be used.

When it is desired to utilize the terrestrial wireless communication system through the portable terrestrial communication antenna, the connection switching means is first manually or automatically controlled to connect the terrestrial transmission/reception circuit to the signal input/output circuit. If both the stationary and portable terrestrial communication antennas are provided, the antenna connection switching means is further manually or automatically controlled to connect the portable terrestrial communication antenna to the terrestrial transmission/reception circuit. In the signal transmission mode, the terrestrial control means mounted in the portable set causes the signal input/output circuit to send input signals to the terrestrial transmission/reception circuit. The terrestrial transmission/reception circuit processes the signals in the predetermined manner, the processed signals being then supplied to the portable terrestrial communication antenna. Thus, the signals are transmitted to, for example, the terrestrial wireless communication system through the portable terrestrial communication antenna. In the signal reception mode, the portable terrestrial communication antenna receives signals from the base station. The received signals are supplied to the terrestrial transmission/reception circuit. The terrestrial transmission/reception circuit processes the supplied signals in the predetermined manner. The terrestrial control means provides the signals processed by the terrestrial transmission/reception circuit to the signal input/output circuit. The signal input/output circuit outputs the signals to the user.

When it is desired to utilize the terrestrial wireless communication system through the stationary terrestrial communication antenna, the terrestrial transmission/reception circuit is similarly connected to the signal input/output circuit. In such a case, the antenna connection switching means is manually or automatically controlled to connect the stationary terrestrial communication antenna to the terrestrial transmission/reception circuit. The signal transmission/reception is similar to that of the case when the terrestrial wireless communication system is utilized through the portable terrestrial communication antenna, except that an antenna to be used is the stationary terrestrial communication antenna.

By selecting two or three different types of antenna, the communication can be preferably realized. Particularly, when a terrestrial communication antenna is formed by two types, namely portable and stationary, terrestrial communication antenna, the antenna connection switching means can be automatically controlled to use the stationary terrestrial communication antenna, for example, when the portable machine is connected to the satellite transceiver. In this case, the antenna connection switching means may be in the form of an antenna selecting switch which responds to a command from the terrestrial control means to select and connect one of the stationary and portable terrestrial communication antennas with the terrestrial transmission/reception circuit.

When the automated control of the antenna connection switching means (e.g., antenna selecting switch) is carried out for such a purpose, the satellite control means detects a potential appearing, for example, at the connection between the satellite transceiver and the portable set to judge whether or not the satellite transceiver is connected to the portable set. If the satellite transceiver is connected to the portable set, the satellite control means provides a signal indicative of this connection to the terrestrial control means. When such a signal is received by the satellite control means, the terrestrial control means controls the antenna connection switching means to connect the stationary terrestrial communication antenna to the signal input/output circuit. However, the signal input/output circuit must be connected to the terrestrial transmission/reception circuit, as an assumption. On the contrary, if the terrestrial control means does not receive a signal indicative of the connection between the satellite transceiver and the portable set from the satellite control means, the terrestrial control means controls the antenna connection switching means to connect the portable terrestrial communication antenna to the signal input/output circuit. Such an arrangement can automatically select an antenna which performs a more preferred reception.

In view of the fact that almost all the satellite wireless communication systems used currently and in the near future utilize digital communication, the satellite transmission/reception circuit is preferably in the form of a digital communication circuit. In such a case, signals from the signal input/output circuit are supplied to the satellite transmission/reception circuit through the satellite control means when the satellite transmission/reception circuit is connected to the signal input/output circuit. The satellite transmission/reception circuit comprises digital communication transmission and reception means. Signals are supplied from the signal input/output circuit to the transmission means. The transmission means codes the supplied signals. The coded signals and then used as modulation signals to digitally modulate transmission signals which are in turn supplied to the satellite communication antenna. The signals received by the satellite communication antenna are digitally demodulated and decoded by the reception means. The satellite control means provides the decoded signals to the signal input/output circuit when in turn outputs them to the user.

A typical terrestrial wireless communication system currently used in an analog cellular system. If the mobile communication terminal equipment of the present invention is to be used in such a type of system, the terrestrial transmission/reception circuit is in the form of an analog communication circuit. In this case, when the terrestrial transmission/reception circuit is connected to the signal input/output circuit, signals from the signal input/output circuit are supplied to the terrestrial transmission/reception circuit through the terrestrial control means. The terrestrial transmission/reception circuit comprises analog communication transmission and reception means. Signals are provided from the signal input/output circuit to the transmission means. The transmission means uses the supplied signals as modulation signals to analog modulate transmission signals which are in turn sent to the portable or stationary terrestrial communication antenna. The signals received by the portable or stationary terrestrial communication antenna are analog demodulated and decoded by the reception means. The terrestrial control means supplied the decoded signals to the signal input/output circuit which outputs the signals to the user.

When the mobile communication terminal equipment of the present invention is to be used in the digital cellular system, the terrestrial transmission/reception circuit is in the form of a digital communication circuit. In this case, when the terrestrial transmission/reception circuit is connected to the signal input/output circuit, signals from the signal input/output circuit are fed to the terrestrial transmission/reception circuit through the terrestrial control means. The terrestrial transmission/reception circuit comprises digital communication transmission and reception means. Signals from the signal input/output circuit are supplied to the transmission means. The transmission means codes the supplied signals. The coded signals are used as modulation signals to subject transmission signals to the digital modulation, the modulated signals being then supplied to the portable or stationary terrestrial communication antenna. The received signals are then digitally demodulated and decoded by the reception means. The terrestrial control means sends the decoded signals to the signal input/output circuit which in turn outputs these signals to the user.

The alternating between the satellite mobile communication system and the terrestrial mobile communication system can be preferably executed by utilizing the control signals. In such a case, the satellite and terrestrial control means monitor the signal reception state at the satellite or terrestrial transmission/reception circuit. When the portable set is connected to the satellite transceiver, the terrestrial control means informs the satellite control means of the monitored result. The satellite control means compares a signal reception state at the satellite transmission/reception circuit and a signal reception state at the terrestrial transmission/reception circuit which is taught by the terrestrial control means with a predetermined reference condition. The reference condition may be either of a reception level (in the analog and digital communications) or an error rate (in the digital communication). The reception level or error rate must be preset to the satellite and terrestrial transmission/reception circuits, respectively. The satellite control means executes different operations depending on the comparison result.

If the result is such that the signal reception state at the terrestrial transmission/reception circuit is sufficient to continue the signal reception at the terrestrial transmission/reception circuit, the satellite control means controls the connection switching means to connect the terrestrial transmission/reception circuit with the signal input/output circuit. Such an operation may be executed by the satellite control means solely or in cooperation with the terrestrial control means. If the result is such that the signal reception state at the terrestrial transmission/reception circuit is not sufficient to continue the signal reception at the terrestrial transmission/reception circuit, but that the signal reception state at the satellite transmission/reception circuit provides a relatively good reception state if the signals are received by the satellite transmission/reception circuit, the satellite control means controls the connection switching means to connect the satellite transmission/reception circuit with the signal input/output circuit. This operation may similarly be executed by the satellite control means solely or in cooperation with the terrestrial control means.

If the terminal equipment of the present invention is to be used in a voice communication, the signal input/output circuit may include a microphone for inputting voice signals from the user and loudspeakers for outputting voice signals to the user. The connection between the satellite transmission/reception circuit and the portable set may be performed by an electrically connectable/disconnectable connector. In this case, one of the communications through the satellite and terrestrial wireless communication systems can be selected and executed when the connector of the satellite transceiver is electrically connected to the connector of the portable set. When the connector of the satellite transceiver is electrically disconnected from the connector of the portable set, the mobile communication terminal equipment can perform the communication through the terrestrial wireless communication system.

DETAILED DESCRIPTION OF THE PREFERRED EMBODIMENTS

Figure 1:
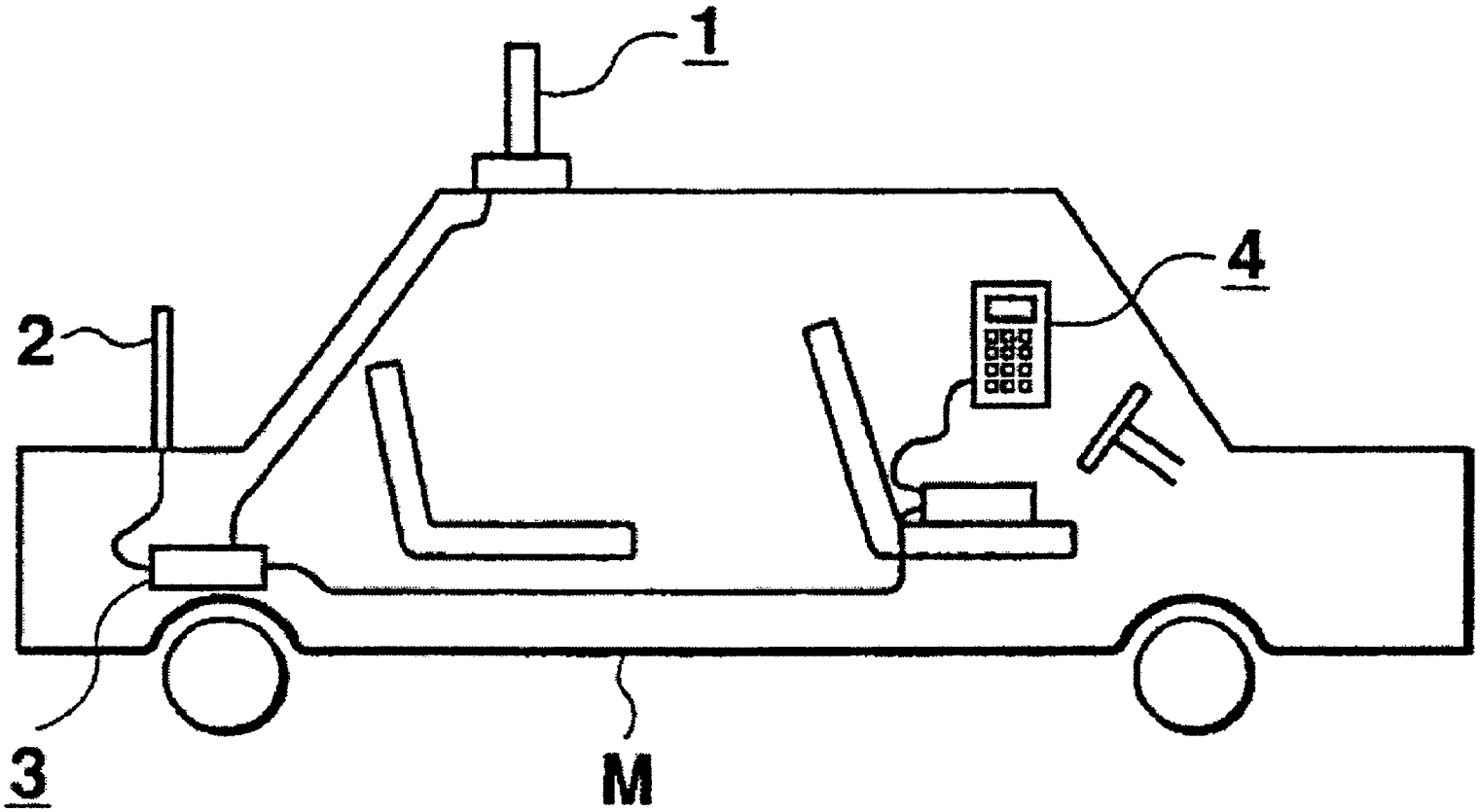
FIG. 1 is a conceptual view of a vehicle in which the first embodiment of a mobile communication terminal equipment constructed in accordance with the present invention is mounted, particularly showing the layout of units in the vehicle.

Some preferred embodiments of the present invention will now be described. It is to be understood that parts having the same function or placed in the corresponding relationship relative to one another are denoted by the same reference numeral throughout the illustrated embodiments.

(1) First Embodiment

Figure 2:
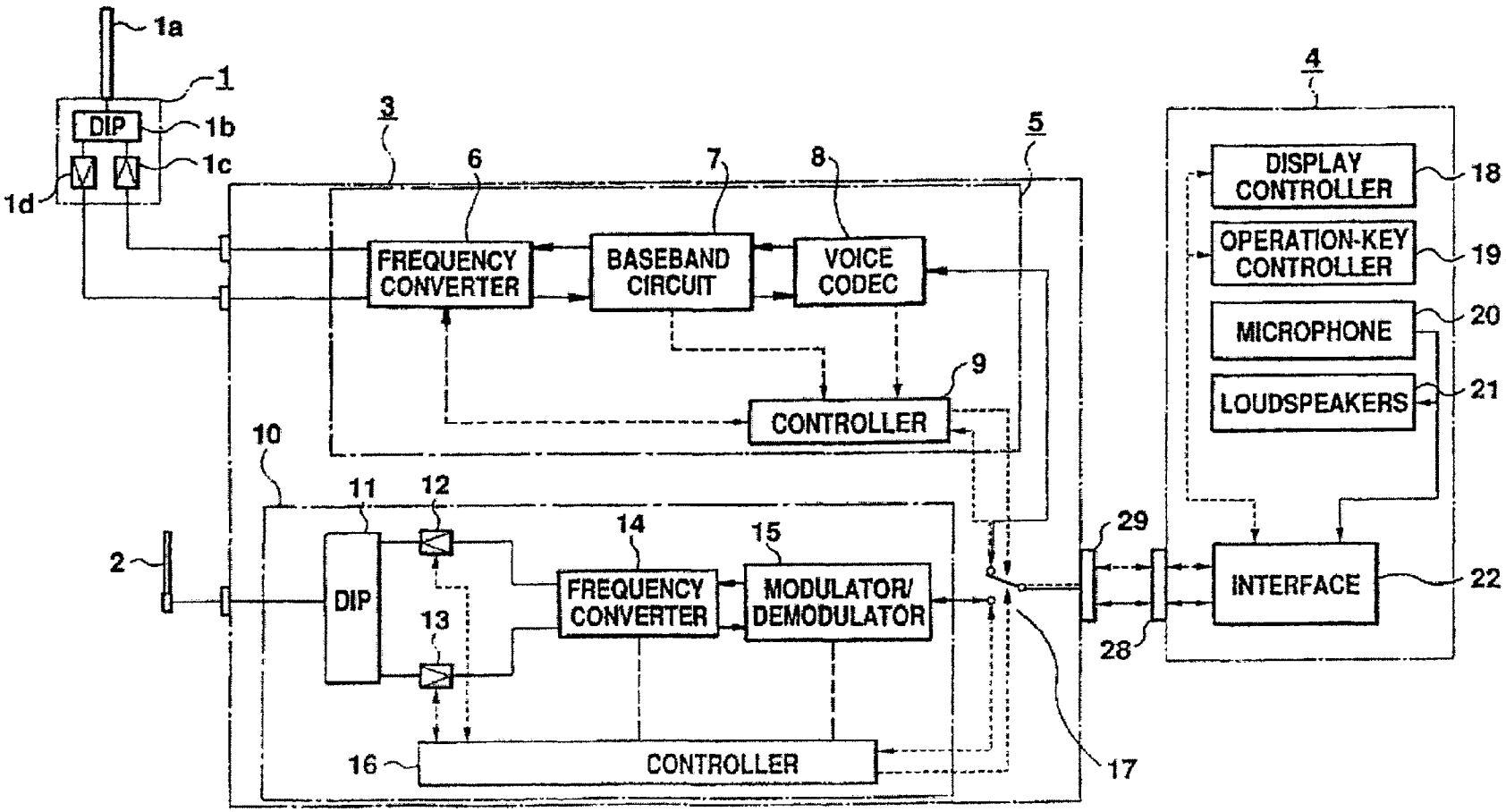
FIG. 2 is a block diagram of the mobile communication terminal equipment shown in FIG. 1, showing the flow of transmitted and received signals by solid lines and the flow of control signals by broken lines.
Figure 3:
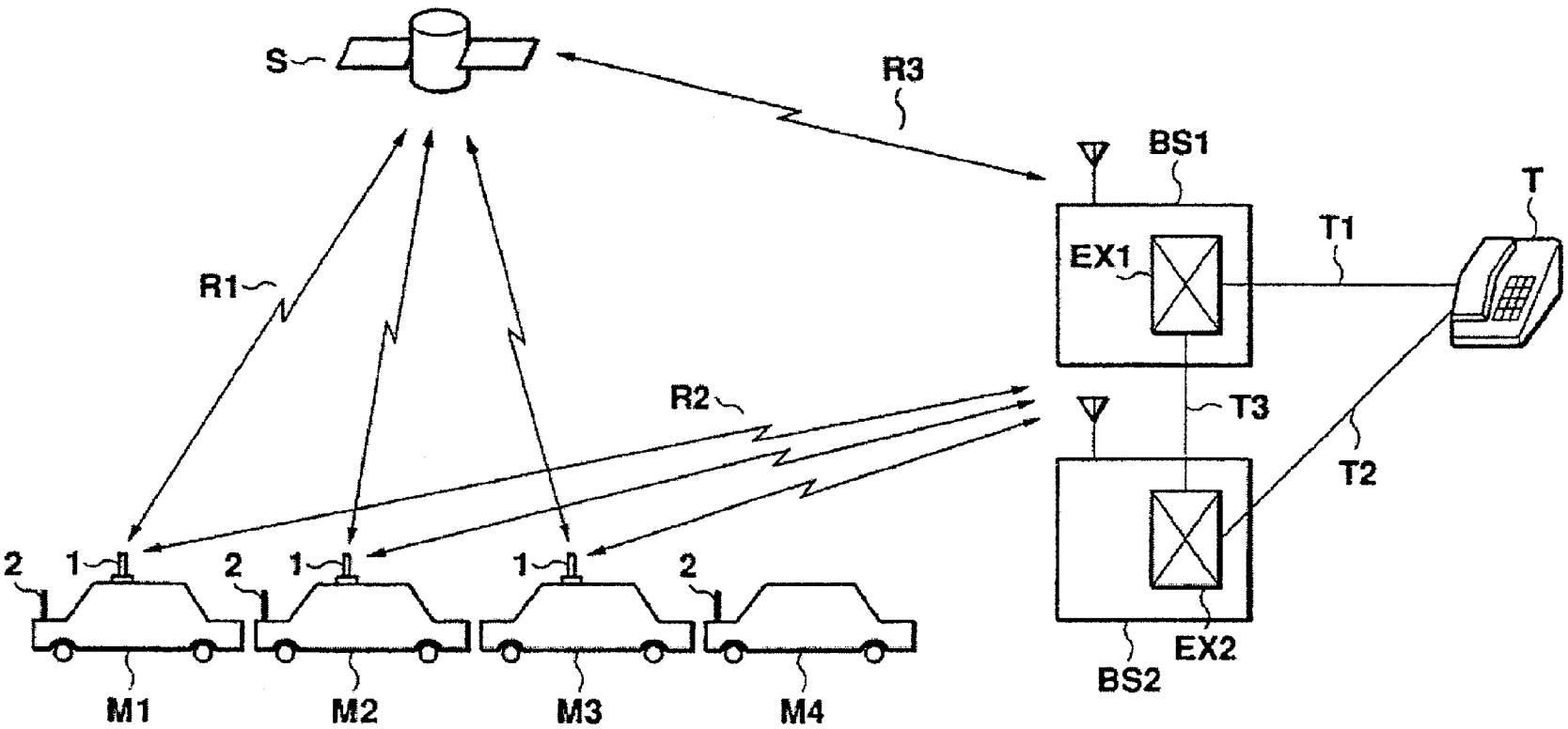
FIG. 3 is a system chart of an environment in which the mobile communication terminal equipment shown in FIG. 1 is used.

FIGS. 1–3 show the first embodiment of the present invention.

As shown in FIG. 1, a mover M includes a satellite communication antenna 1 and cellular antenna 2 which are mounted thereon at a place having a fine view, for example, on the roof of the vehicle M when it is an automobile. The satellite communication antenna 1 is used to perform the communication with the other communication terminal equipment through an artificial satellite and a ground station for satellite communication system. The cellular antenna 2 is used to make the communication with the other communication terminal equipment through a ground station in a cellular system. These antennas 1 and 2 are connected to a transceiver unit 3. The transceiver unit 3 may be disposed within the interior of the vehicle M, for example, the trunk of an automobile. The transceiver unit 3 has functions of handling and controlling the wireless communication. The transceiver unit 3 is also connected to a hand set 4 which has functions of inputting commands from the user, displaying states of the terminal equipment and communication channels and inputting/outputting voice signals.

As shown in FIG. 2, the transceiver unit 3 comprises a satellite communication transceiver 5, a cellular transceiver 10 and a switch 17. The satellite communication transceiver 5 is necessary when using the satellite communication system (satellite mode) and therefore the satellite communication antenna 1 is connected to the transceiver 5. The cellular transceiver 10 is necessary when using the cellular system (cellular mode) and therefore the cellular antenna 2 is connected to the transceiver 10. The switch 17 is means for selectively connecting the hand set 4 to one of the transceivers 5 and 10. The switch 17 is controlled by the transceivers 5 and 10.

The satellite mode wireless communication processing function is mainly realized by the satellite communication transceivers 5, a part of which is also realized by the satellite communication antenna 1. It is of course possible that all these functions may be included in the satellite communication transceiver 5. The satellite communication transceiver 5 comprises a frequency converter 6, a base band circuit 7, a voice codec 8 and a controller 9. The satellite communication antenna 1 comprises an antenna body 1a, a diplexer 1b, a high-power amplifier 1c for transmission and a low-noise amplifier 1d for reception.

When the hand set 4 is connected to the satellite communication transceiver 5 through the switch 17, voice signals (transmission signals) and control signals are supplied from the hand set 4 to the satellite communication transceiver 5 through the switch 17 while voice signals (reception signals) and control signals are provided from the satellite communication transceiver 5 to the hand set 4 through the switch 17.

The signal transmitting function of the satellite communication transceiver 5 will be realized as follows:

Voice signals of the signals supplied from the hand set 4 to the satellite communication transceiver 5 through the switch 17 are first inputted into the voice codec 8, with a part of control signals being also inputted into the voice codec 8. The other control signals are inputted into the controller 9. The signals inputted into the voice codec 8 are coded according to a predetermined coding rule, the coded signals being then inputted into the base band circuit 7. The base band circuit 7 subjects these signals to base band processing steps such as modulation and others, the processed signals being then inputted into the frequency converter 6. The frequency converter 6 converts the frequency of the received signals from the base band frequency into a radio frequency, the converted signals being then supplied to the highpower transmission amplifier 1c. The high-power transmission amplifier 1c amplifies and sends the signals to the antenna body 1a through the diplexer 1b. Thus, the signals will be transmitted through the antenna. Such a digital communication process is carried out because the satellite communication system handled by the first embodiment is a digital communication system.

The signal reception function of the satellite communication transceiver 5 will be realized as follows:

Signals of radio frequency received by the antenna body 1a are first inputted into the low-noise reception amplifier 1d through the diplexer 1b. The low-noise reception amplifier 1d low-noise amplifies and sends the signals to the frequency converter 6. The frequency converter 6 converts the frequency of the inputted signals from the radio frequency into the base band frequency, the converted signals being then sent to the base band circuit 7. The base band circuit 7 subjects the signals to the base band processing steps such as demodulation and the others before they are inputted into the voice codec 8. The voice codec 8 decodes the signals in accordance with the coding rule, the decoded signals being then fed to the hand set 4 through the switch 17.

The controller 9 responds to the control signals from the hand set 4 to control the parts of the satellite communication transceiver 5 while monitoring the states of the parts of the satellite communication transceiver 5 and the signal reception station thereof. As will be described, the controller 9 controls the switch 17 and hand set 4 depending on the control signals and monitoring results.

The cellular mode wireless communication processing function will be realized by the cellular transceiver 10. The cellular transceiver 10 comprises a diplexer 11, a high-power amplifier 12 for transmission, a low-noise amplifier 13 for reception, a frequency converter 14, a modulator/demodulator 15 and a controller 16.

When the hand set 4 is connected to the cellular transceiver 10 through the switch 17, voice signals (transmission signals) and control signals are supplied from the hand set 4 to the cellular transceiver 10 through the switch 17 while voice signals (reception signals) and control signals are provided from the cellular transceiver 10 to the hand set 4 through the switch 17.

The signal transmission function of the cellular transceiver 10 will be realized as follows:

Voice signals of the signals supplied form the hand set 4 to the cellular transceiver 10 through the switch 17 are inputted into the modulator/demodulator 15, with some of the control signals also being inputted into the modulator/demodulator 15. The other control signals are inputted into the controller 16. The modulator/demodulator 15 modulates carriers by using the receive signals as analog modulation signals and the modulated carriers are in turn sent to the frequency converter 14. The frequency converter 14 converts the frequency of the signals from the base band frequency into the radio frequency, the converted signals being fed to the high-power transmission amplifier 12. The high-power transmission amplifier 12 amplifies the power of the signals, the amplified signals being supplied to the antenna 2 through the diplexer 11. Thus, the signals will be transmitted through the antenna 2. The analog communication process is carried out because the cellular system handled by the first embodiment is an analog communication system.

The signal reception function of the cellular transceiver 10 will be realized as follows:

Signals of radio frequency received by the antenna 2 are first inputted into the low-noise reception amplifier 13 through the diplexer 11. The low-noise reception amplifier 13 low-noise amplifies and sends the signals to the frequency converter 14. The frequency converter 14 converts the frequency of the inputted signals from the radio frequency into the base band frequency, the converted signals being then sent to the modulator/demodulator 15. The modulator/demodulator 15 demodulates the voice signals and control signals from the reception signals and the demodulated signals are in turn supplied to the hand set 4 through the switch 17.

The controller 16 responds to the control signals from the hand set 4 to control the parts of the cellular transceiver 10 while monitoring the states of the parts of the cellular transceiver 10 and the signal reception state thereof. As will be described, the controller 16 controls the switch 17 and hand set 4 depending on the control signals and monitoring results.

The transceiver unit 3 is connected to the hand set 4 through connectors 29 and 28. In other words, the voice and control signals handled through the switch 17 are supplied to the hand set 4 through the connectors 29 and 28. The hand set 4 has a display controller 18, an operation key controller 19, a microphone 20, loudspeakers 21 and an interface 22.

The microphone 20 serves as means for inputting voice signals to be transmitted. Voice signals from the microphone 20 are fed to the transceiver unit 3 through the interface 22. In the satellite mode, the voice codec 8 receives the voice signals through the switch 17 while in the cellular mode, the modulator/demodulator 15 receives the voice signal through the switch 17.

The loudspeakers 21 serve as means for converting and outputting the received voice signals into sound. In the satellite mode, the voice signals are outputted from the voice codec 8 to the loudspeakers 21 through the switch 17 and interface 22 while in the cellular mode, the voice signals are outputted from the modulator/demodulator 15 to the loudspeakers 21 through the switch 17 and interface 22.

The operation key controller 19 serves as means for inputting commands from the user to the terminal equipment and comprises a panel including a plurality of operation keys and a controlling function. Commands from the operation key controller 19 are supplied to the transceiver unit 3 through the interface 22 as control signals. In the satellite mode, the transceiver 5 receives the control signals while in the cellular mode, the transceiver 10 receives the control signals. At least some of the inputted control signals are inputted into the controller 9 or 16. The controller 9 or 16 responds to the inputted control signals to control the parts of the transceiver 5 or 10. If the inputted control signals indicate the alternating from the satellite mode to the cellular mode and vice versa, the controller 9 or 16 received the control signals provides a control signal to the switch 17 which will thus connect the transceiver 10 or 5 to the hand set 4.

The display controller 18 displays the necessary information depending on the control signals from the controller 9 or 16. For example, the information may include the signal reception state, the operational state of the system, the selected mode and other data.

According to the first embodiment, therefore, the satellite wireless communication system can be utilized to continue the communication even at an area and/or region which do not belong to any cell in the cellular system. Since the hand set 4 is shared by both the satellite and cellular communication systems, the entire structure can be reduced in size with the heat value being suppressed, in comparison with a case when the mobile station functions of the satellite and cellular communication systems are simply combined.

The system of the first embodiment may be used, for example, in such an environment as shown in FIG. 3. FIG. 3 shows four vehicles M1–M4. Terminal equipments constructed according to the first embodiment are mounted in the vehicles M1 and M2. The vehicle M3 only includes a satellite communication terminal equipment while the vehicle M4 only includes a cellular terminal equipment. The terminal equipments mounted in the vehicles M1–M3 can be connected to a ground station BS1 in a satellite communication system through a radio transmission channel R1, an artificial satellite S and a radio transmission channel R3 while the terminals of the vehicles M1, M2 and M4 can be connected to a base station BS2 of a cellular system through a radio transmission channel R2. The ground and base stations BS1, BS2 are further connected to a public telephone line T1 or T2 through an exchanger EX1 or EX2. The public telephone lines T1 and T2 are connected to a general telephone set. The exchangers EX1 and EX2 are connected to each other through a public telephone line T3.

Therefore, this embodiment can perform the communication through new channels as follows:

a) M1<-->R1<-->S<-->R3<-->BS1<-->R3<-->S<-->R1<-->M2 b) M1<-->R2<-->BS2<-->R2<-->M2<--> c) M1<-->R1<-->S<-->R3<-->BS1<-->T3<-->BS2<-->R2<-->M2 d) M1<-->R2<-->BS2<-->T3<-->BS1<-->R3<-->S<-->R1<-->M2 e) M1 or M2<-->R1<-->S<-->R3<-->BS1<-->R3<-->S<-->R1<-->M3 f) M1 or M2<-->R2 <-->BS2<-->T3<-->BS1<-->R3<-->S <-->R1<-->M3 g) M1 or M2<-->R2<-->BS2<-->R2<-->M4 h) M1 or M2<-->R1<-->S<-->R3<-->BS1<-->T3<-->BS2<-->R2<-->M4 i) M1 or M2<-->R1<-->S<-->R3<-->BS1<-->T1<-->T j) M1 or M2<-->R2<-->BS2<-->T2<-->T

For example, the communication may be carried out between the vehicles M1 and M2 through one or four channels a)–d). The communication may be made between the vehicles M1 or M2 and M4 through one of two channels e) and f). The communication may be performed between the vehicle M1 or M2 and the general telephone set T through one of two channels i) and j). Although only a single ground base station is shown in FIG. 3, a plurality of such stations may actually be provided. It is therefore obviously possible that bypass channels h') and j') from any vehicle to a base station BS2 responsible for the other cells may be routed through the public telephone line.

The prior art can only provide three channels as follows:

k) M3<-->R1<-->S<-->R23<-->BS1<-->T3<-->BS2<-->R2<-->M4 l) M3<-->R1<-->S<-->R3<-->BS1<-->T1<-->T m) M4<-->R2<-->BS2<-->T2<-->T

Such a great number of channels are realized by providing a single vehicle in which the mobile stations of both the satellite and cellular communication systems are mounted together.

(2) Second Embodiment

Figure 4:
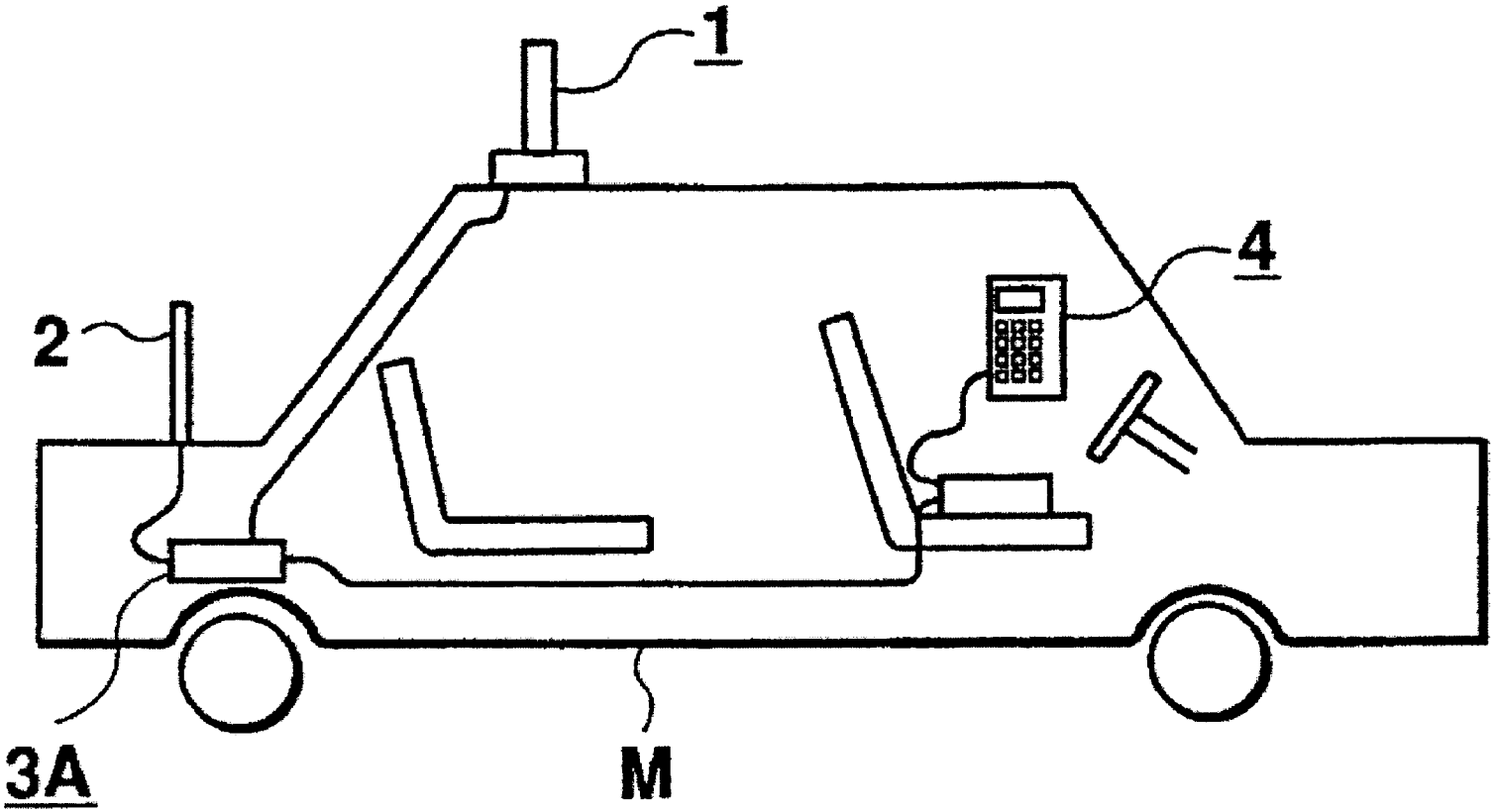
FIG. 4 is a conceptual view of a vehicle in which the second embodiment of a mobile communication terminal equipment constructed in accordance with the present invention is mounted, particularly showing the layout of units in this vehicle.
Figure 5:
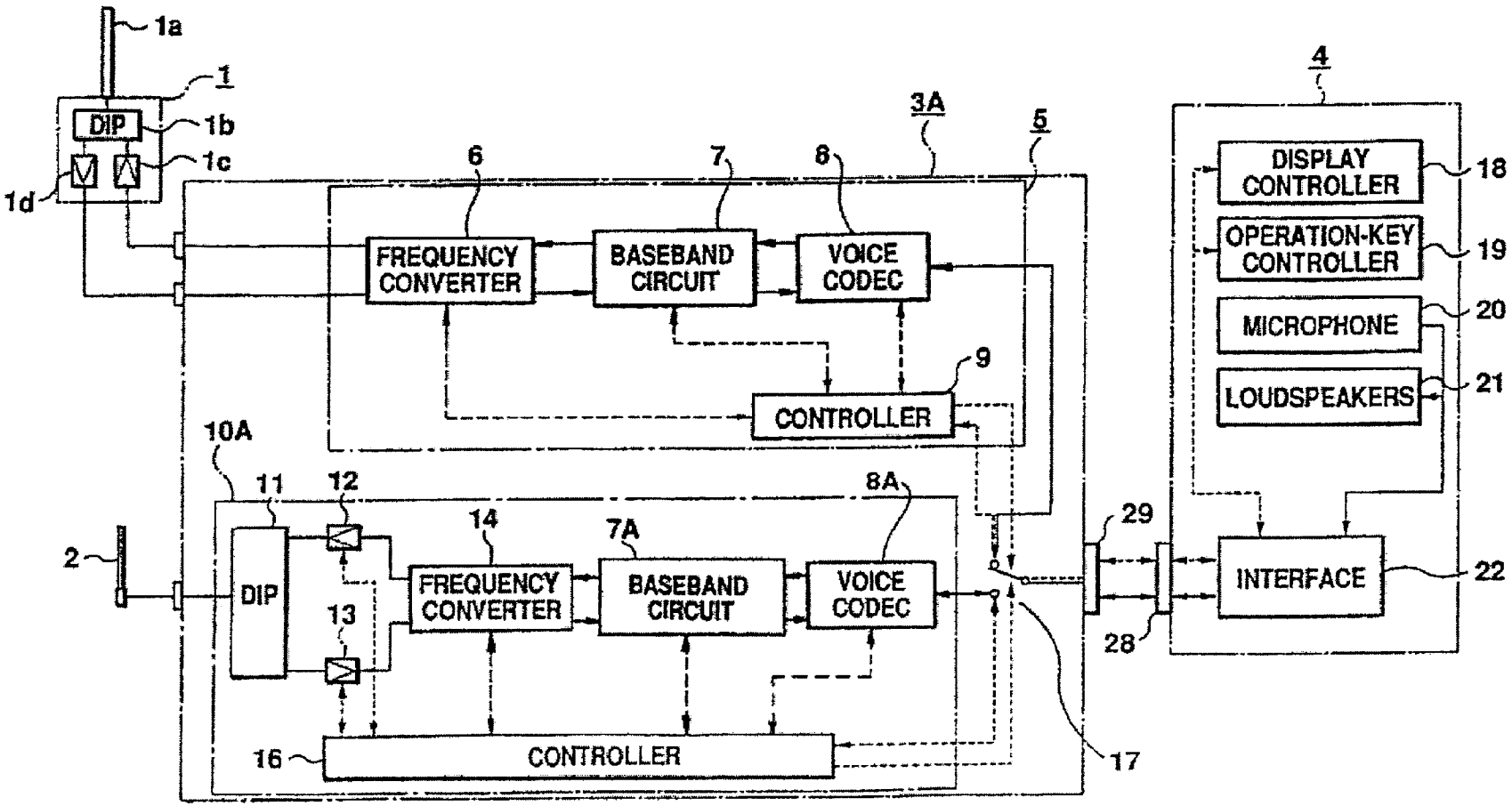
FIG. 5 is a block diagram of the mobile communication terminal equipment shown in FIG. 4, showing the flow of transmitted and received signals by solid lines and the flow of control signals by broken lines.

FIGS. 4 and 5 show the second embodiment of the present invention. In this embodiment, the transceiver unit 3 of the first embodiment is replaced by a transceiver unit 3A which utilizes a base band circuit 7A and voice codec 8A in place of the modulator/demodulator 15. Therefore, the second embodiment can be applied to a digital cellular system. The other parts and advantages are similar to those of the first embodiment.

(3) Third Embodiment

Figure 6:
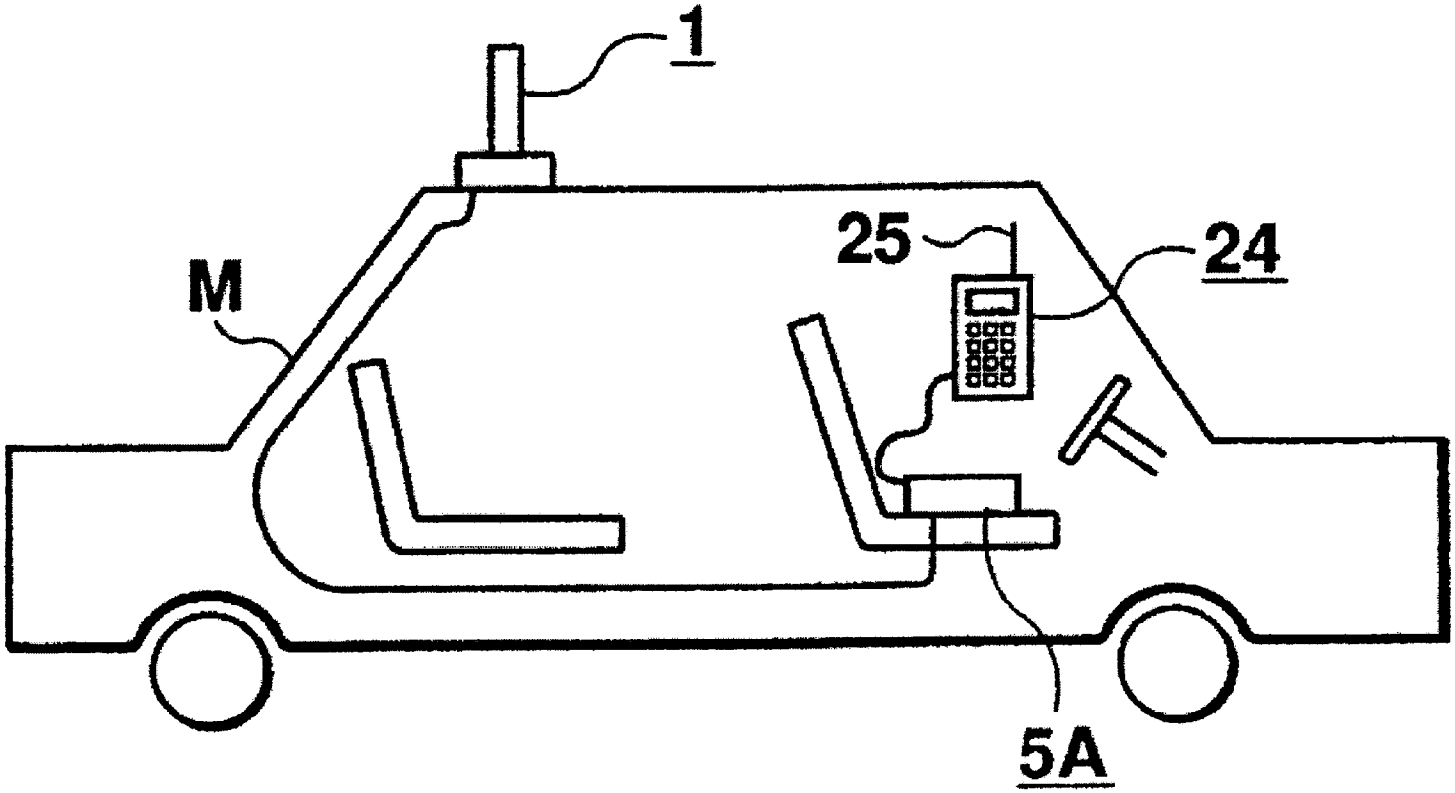
FIG. 6 is a conceptual view of a vehicle in which the third embodiment of a mobile communication terminal equipment constructed in accordance with the present invention is mounted, particularly showing the layout of units in this vehicle.
Figure 7:
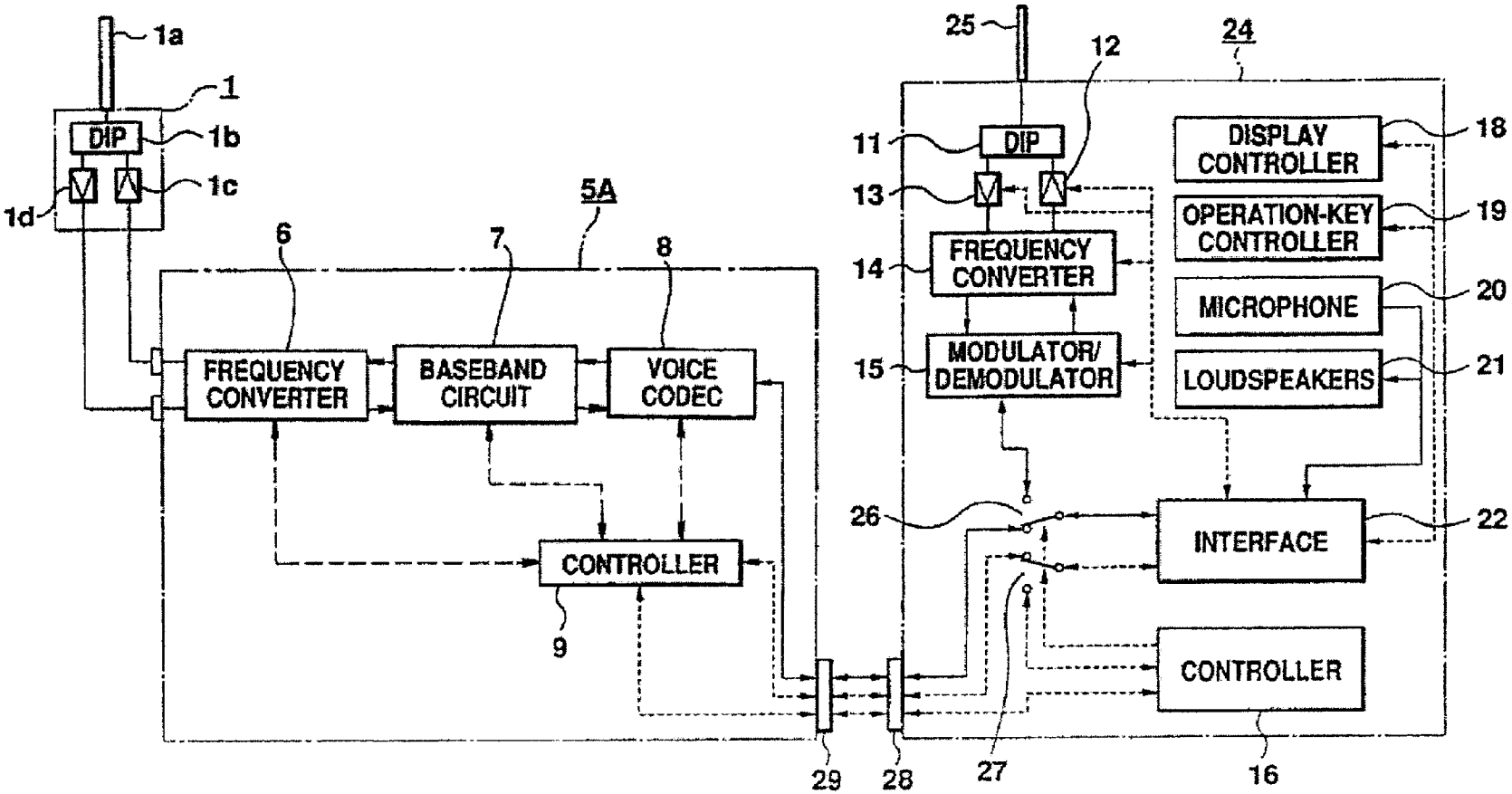
FIG. 7 is a block diagram of the mobile communication terminal equipment shown in FIG. 6, showing the flow of transmitted and received signals by solid lines and the flow of control signals by broken lines.
Figure 8:
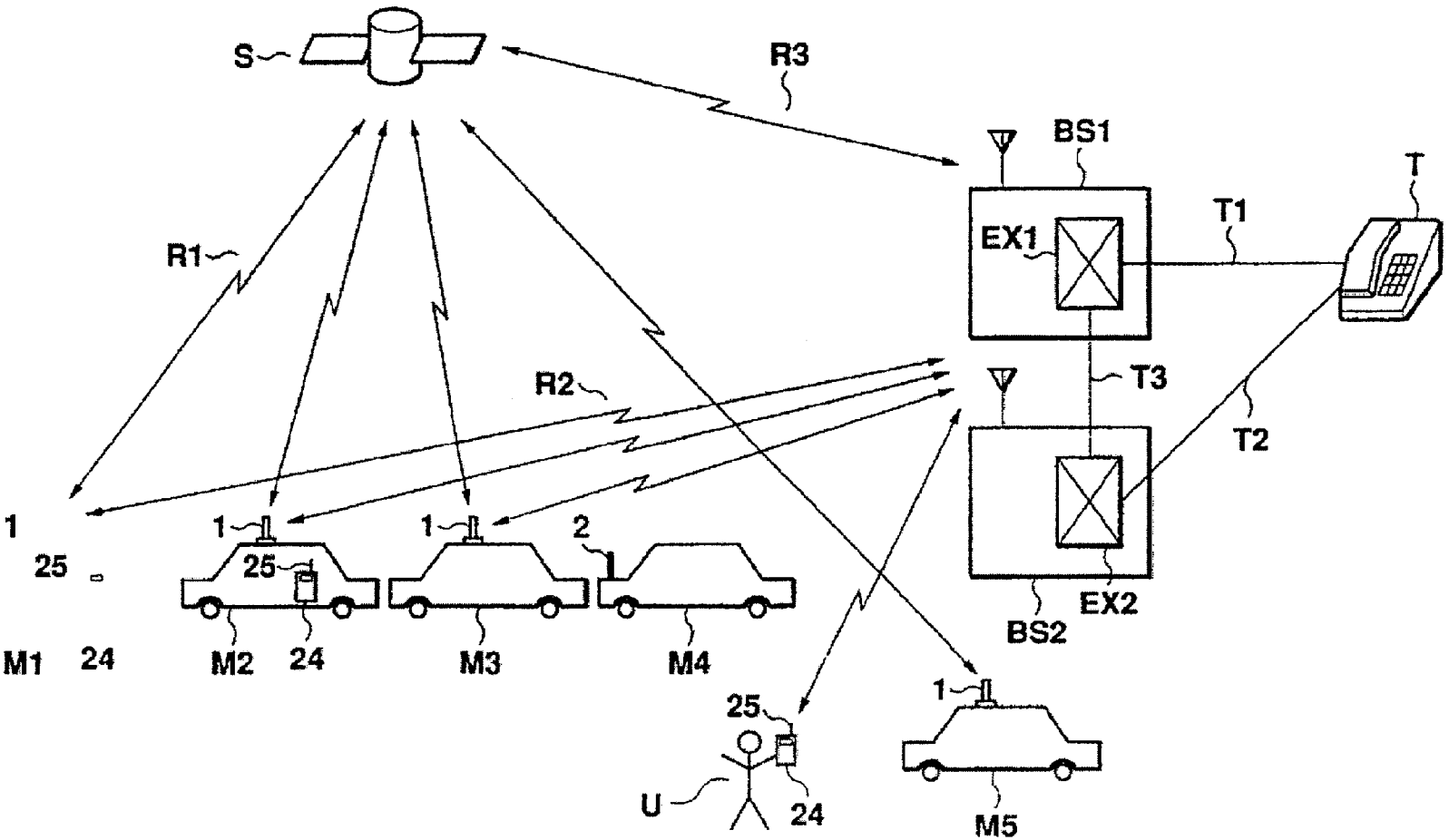
FIG. 8 is a system chart of an environment in which the mobile communication terminal equipment shown in FIG. 6 is used.

FIGS. 6–8 show the third embodiment of the present invention.

The third embodiment includes an independent transceiver 5A which has the satellite wireless communication processing function separated from the other functions of the transceiver unit 3 in the first embodiment. The third embodiment also includes a hand set 24 which has the cellular wireless communication processing function together with such functions as in the hand set 4 of the first and second embodiments. The transceiver 5A can be releasably connected to the hand set 24 through connectors 28 and 29. For such a purpose, the cellular antenna 2 in the first and second embodiments is replaced by a cellular antenna 25 which is arranged at the hand set 24. The cellular antenna 25 is one that performs the communication with the other communication terminal equipments through the ground station BS2 of the cellular system, as in the cellular antenna 2 of the first and second embodiments. The transceiver 5A may be disposed in the vehicle adjacent to its driver seat if the vehicle is an automobile.

As shown in FIG. 7, the third embodiment further includes switches 26 and 27 in place of the switch 17. The switches 26 and 27 are mounted in the hand set 24. The switch 26 responds to a command from the controller 9 or 16 to connect the voice codec 8 in the satellite mode or the modulator/demodulator 15 in the cellular mode to the microphone 20 and loudspeakers 21 through the interface 22. The other switch 27 responds to a command from the controller 9 or 16 to connect the controller 9 in the satellite mode or the controller 16 in the cellular mode with the amplifiers 12 and 13, frequency converter 14, modulator/demodulator 15, display controller 18, operating key controller 19 and other components through the interface 22. Thus, the controller 9 performs the control of the voice signal processing and the system operation in the satellite mode while the controller 16 performs this control in the cellular mode. The controllers 9 and 16 are connected to each other through the connectors 28 and 29.

The changing over of the switches 26 and 28 is made on providing a command from the user through the operation key controller 19.

It is now assumed that the connectors 28 and 29 are connected to each other and the terminal equipment is in the satellite mode. The interface 22 is connected to the voice codec 8 and controller 9 through the switches 26 and 27, respectively. If a command of switching the satellite mode into the cellular mode is provided from the operation key controller 19 in such a situation, the command is inputted into the controller 9 through the switch 27. In response to this command, the controller 9 instructs, to the controller 16, that the switches 26 and 27 should be shifted, through the connectors 28 and 29. In response to this command, the controller 16 switches the switches 26 and 27 into the sides of the modulator/demodulator 15 and controller 16, respectively.

It is next assumed that the connectors 28 and 29 are connected to each other and that the terminal equipment is in the cellular mode. The interface 22 is connected to the sides of the modulator/demodulator 15 and controller 16 through the switches 26 and 27, respectively. When a command of switching the cellular mode into the satellite mode is provided from the operation key controller 19, this command is inputted into the controller 16 through the switch 27. The controller 16 responds to the command to switch the switches 26 and 27 into the sides of the voice codec 8 and controller 9, respectively.

If the connectors 28 and 29 are disconnected from each other when the terminal equipment is in the satellite mode, the conntroller 16 knows this fact through the connectors 28 and 29. For example, if one of the terminals defining the connector 29 is grounded at the side of the transceiver 5A, the above fact can be known when the controller 16 detects that the potential of a terminal of the connector 28 corresponding to the grounded terminal of the connectors 29 is made open. The controller 16 responds to this detection to switch the switches 26 and 27 into the sides of the modulator/demodulator 15 and controller 16, respectively.

If the connectors 27 and 28 are disconnected from each other when the terminal equipment is in the cellular mode, the cellular mode cannot be shifted to the satellite mode, but the communication can be carried out in the cellular mode.

According to the third embodiment, therefore, the structure of a fixed part (transceiver 5A) within the vehicle M can be further reduced in size with the heat value thereof being suppressed, in addition to the advantages similar to those of the first embodiment. Since all the components relating to the cellular system are included in the hand set 24, the transceiver 5A is reduced in size and may be arranged adjacent to the driver seat in the automobile.

In this embodiment, the hand set 24 can be released and carried by the user. The first and second embodiments cannot perform the communication when the hand set 4 is disconnected from the transceiver unit 3. However, the third embodiment can use the hand set 4 in the cellular mode even when it is disconnected from the transceiver unit 5A. As shown in FIG. 8, thus, the user U can utilize the cellular terminal function through an increased number of communication channels when he or she is at a location remote from a vehicle M5 in which the terminal equipment of the third embodiment is mounted.

Since the change of mode from the satellite mode to the cellular mode or vice versa can automatically be carried out depending on a command from the operation key controller 19 in the third embodiment, the usability can be greatly improved. The usability can be further improved by detecting the disconnection of the connectors 28 and 29 to make the automatic change of mode.

(4) Fourth Embodiment

Figure 9:
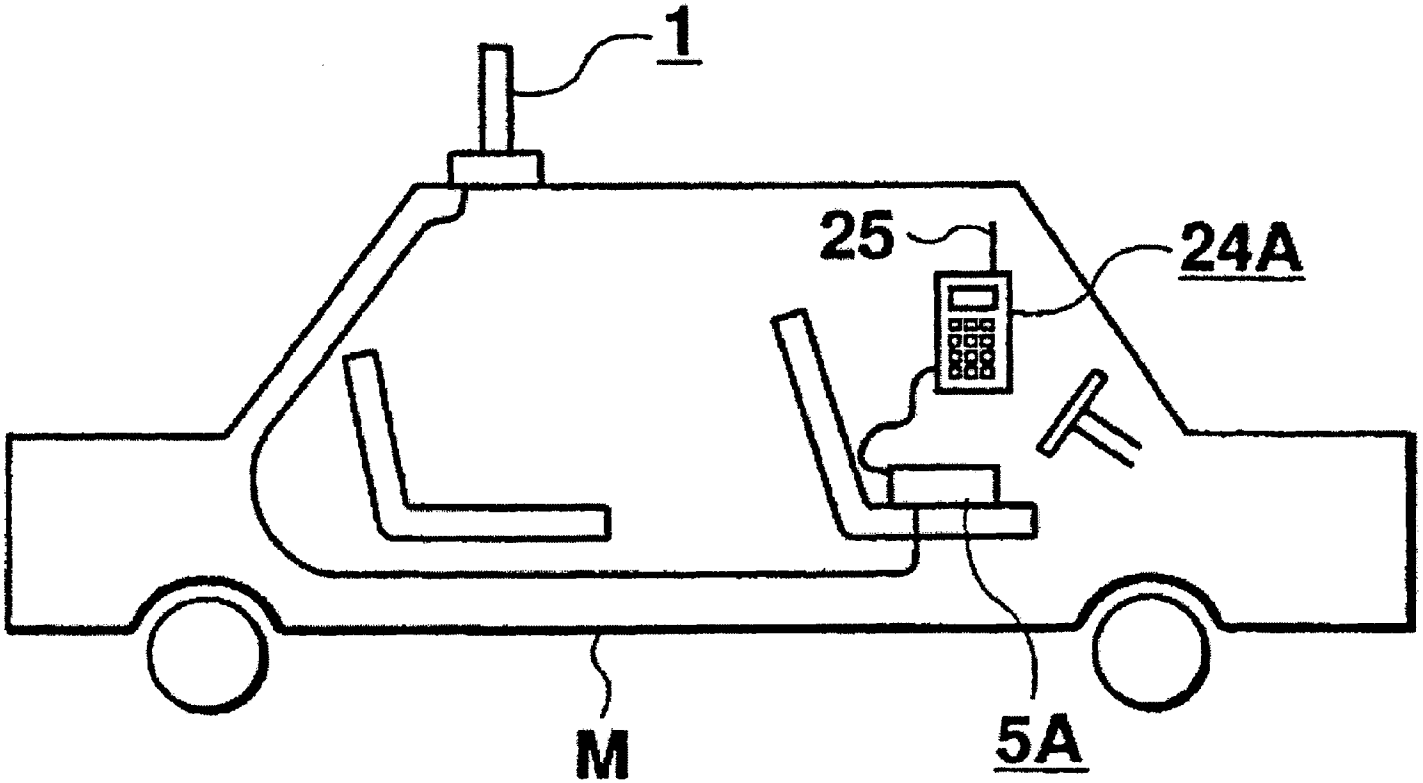
FIG. 9 is a conceptual view of a vehicle in which the fourth embodiment of a mobile communication terminal equipment constructed in accordance with the present invention is mounted, particularly showing the layout of units in this vehicle.
Figure 10:
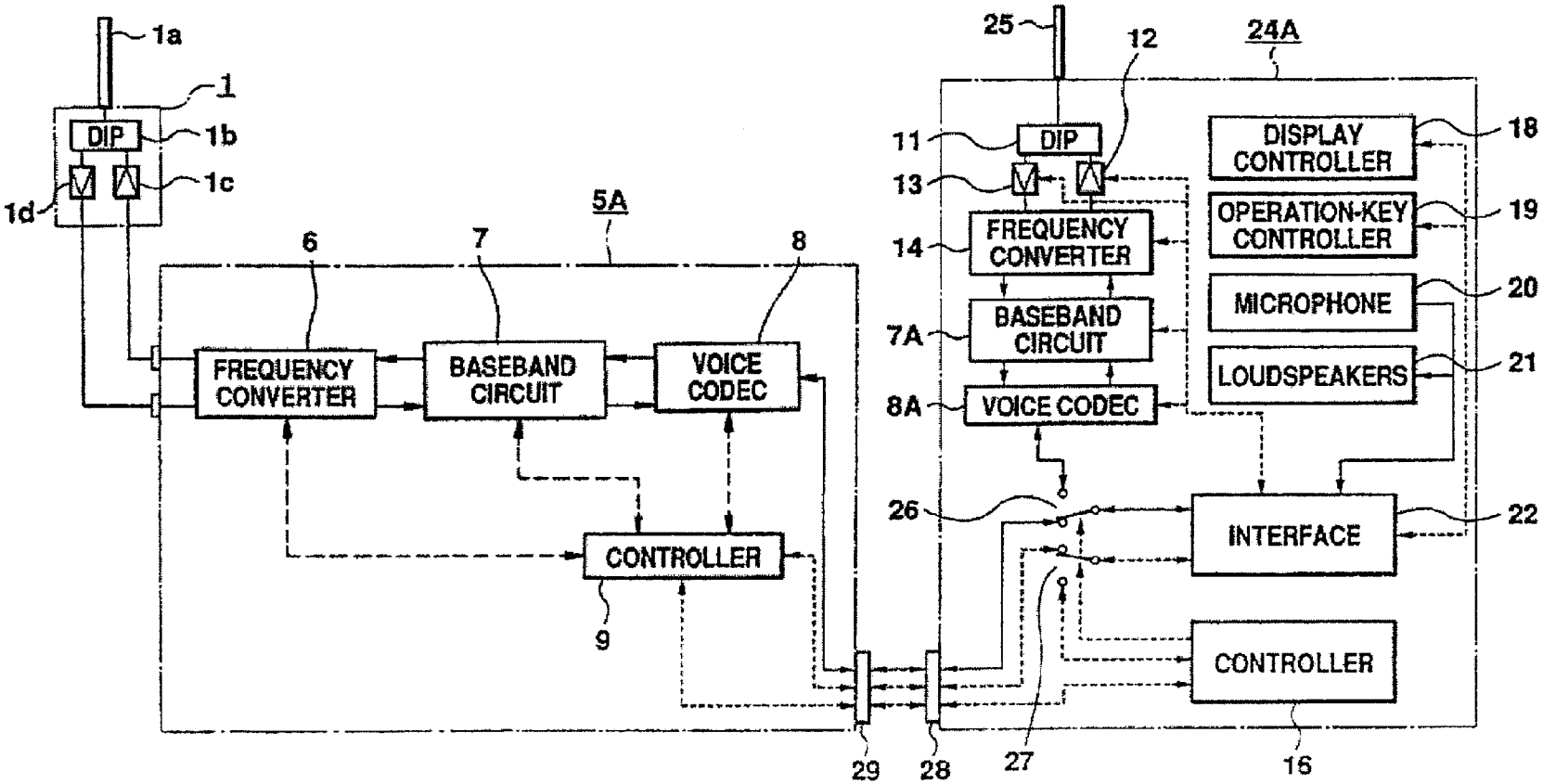
FIG. 10 is a block diagram of the mobile communication terminal equipment shown in FIG. 9, showing the flow of transmitted and received signals by solid lines and the flow of control signals by broken lines.
Figure 11:
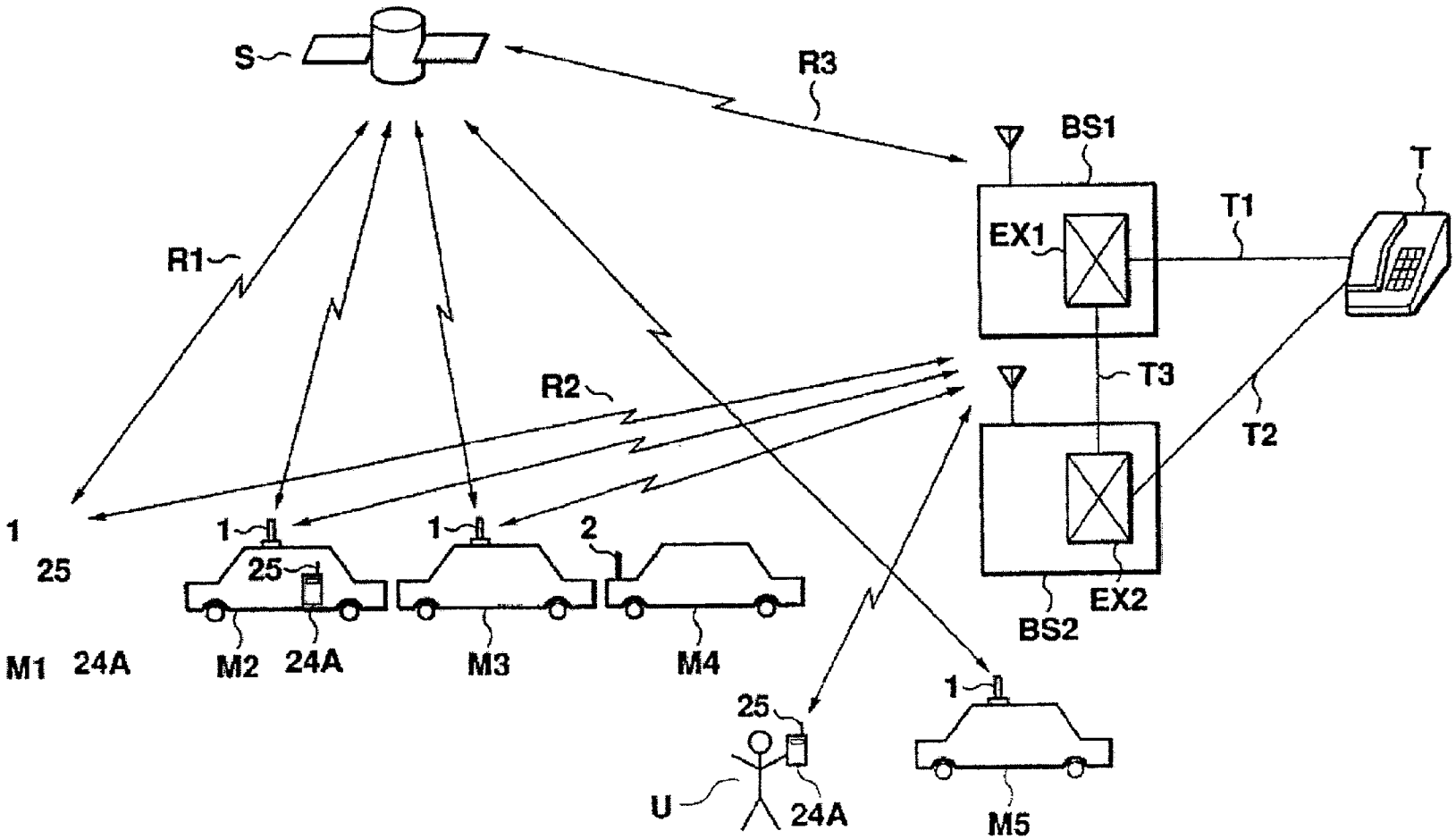
FIG. 11 is a system chart of an environment in which the mobile communication terminal equipment shown in FIG. 9 is used.

FIGS. 9–11 show the fourth embodiment of the present invention in which a hand set 24A is substituted for the hand set 24 in the third embodiment. The hand set 24A utilizes a base band circuit 7A and voice codec 8A in place of the modulator/demodulator 15. Therefore, the fourth embodiment can be applied to the digital cellular communication. The other components and advantages are similar to those of the third embodiment.

(5) Fifth Embodiment

Figure 12:
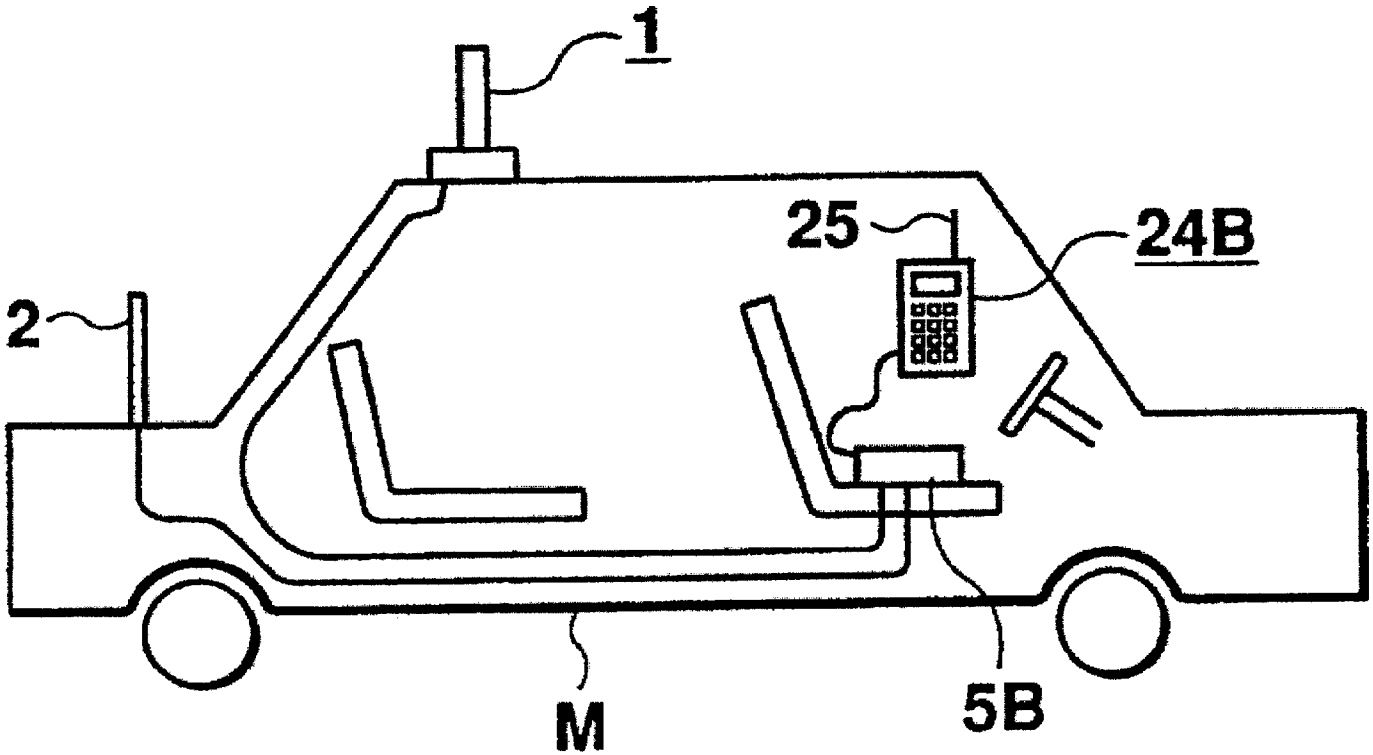
FIG. 12 is a conceptual view of a vehicle in which the fifth embodiment of a mobile communication terminal equipment constructed in accordance with the present invention is mounted, particularly showing the layout of units in this vehicle.
Figure 13:
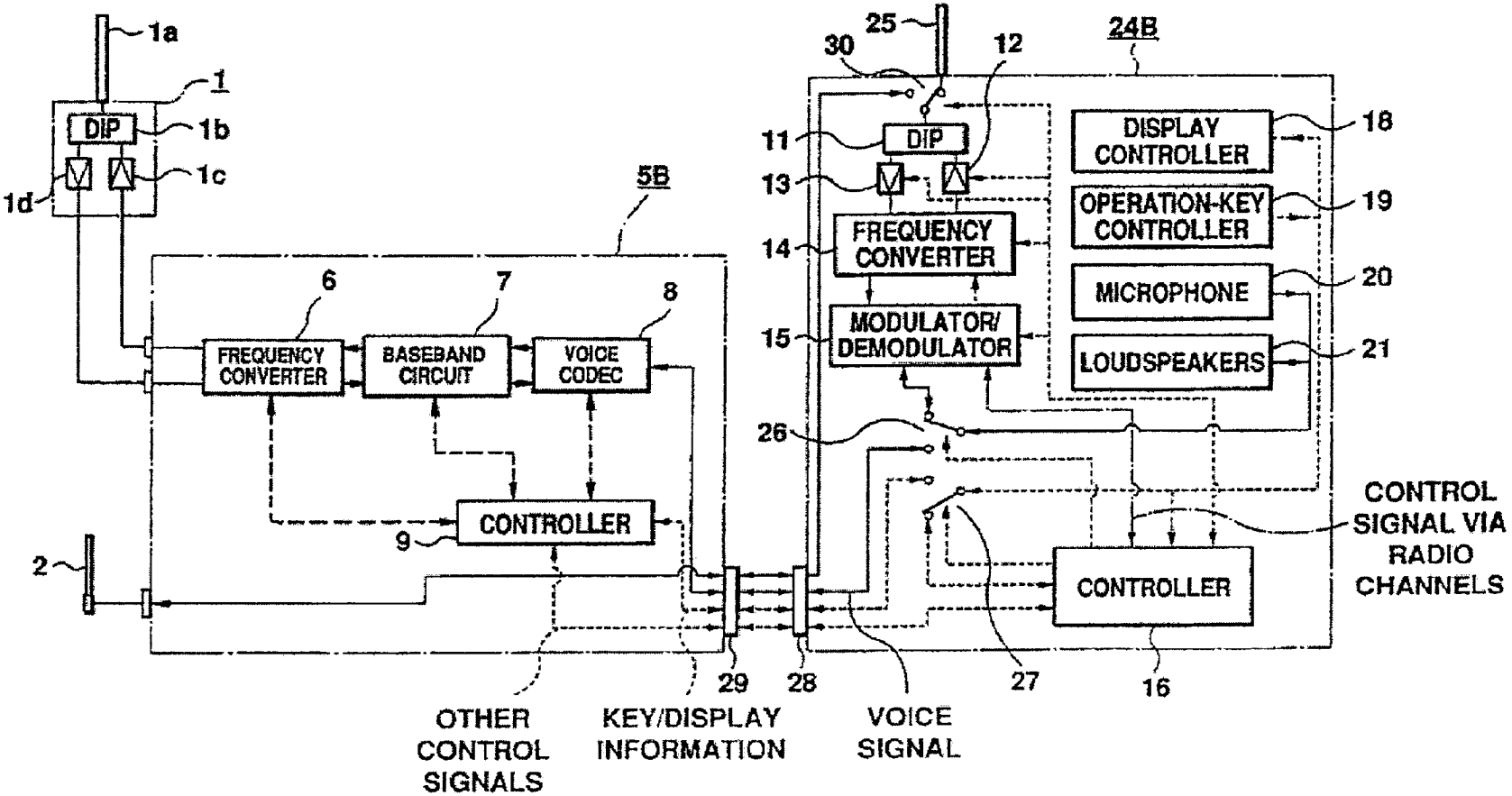
FIG. 13 is a block diagram of the mobile communication terminal equipment shown in FIG. 12, showing the flow of transmitted and received signals by solid lines and the flow of control signals by broken lines.
Figure 14:
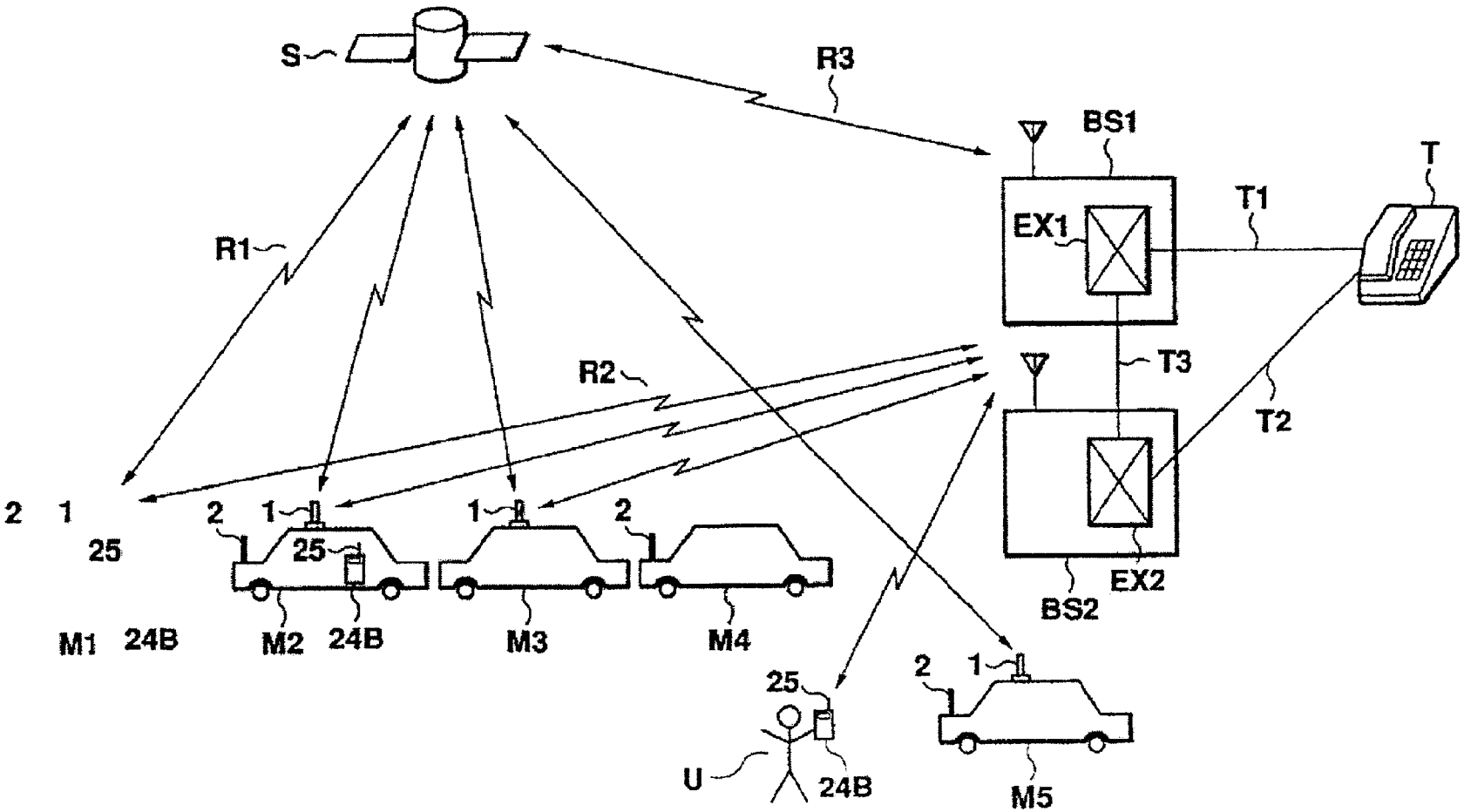
FIG. 14 is a system chart of an environment in which the mobile communication terminal equipment shown in FIG. 12 is used.

FIGS. 12–14 show the fifth embodiment of the present invention in which cellular antenna 2 and switch 30 are further provided in addition to the arrangement of the third embodiment. The cellular antenna 2 is located on a vehicle M at a fine view place. The structure and function of a transceiver 5B are substantially the same as in the transceiver 5A, but different in that the transceiver 5B is connected to the cellular antenna 2. The structure and function of the hand set 24B are substantially the same as in the hand set 24, but different in that the hand set 24B includes the switch 30. The cellular antenna 2 is connected to the connector 29 through the interior of the transceiver 5B and also to the switch 30 through the connector 28. The switch 30 is one for selectively connecting the diplexer 11 to one of the antennas 25 and 2. The switch 30 is controlled by the controller 16. The controller 16 also has a function which is provided by the interface 22 of the third embodiment.

The functions of the fifth embodiment are similar to those of the third embodiment except the automatic antenna selection function thereof. When the connectors 28 and 29 are disconnected from each other, the antenna 25 is automatically connected to the diplexer 11. When the connectors 28 and 29 are connected to each other in the cellular mode, the antenna 2 is connected to the diplexer 11.

It is now assumed that the connectors 28 and 29 are disconnected from each other and that the system is used in the cellular mode. Under such a condition, the switches 26, 27 and 30 are in connection to the modulator/demodulator 15, controller 16 and antenna 25, respectively. When the connectors 28 and 29 are connected to each other under such a condition, it is detected by the controller 9. If one of the terminals defining the connector 28 has been grounded, the above detection can be accomplished by detecting the open potential of a terminal of the connector 29 corresponding to the grounded terminal of the connector 28. In response to the detection, the controller 9 produces and gives a command of actuating the switch 30 to the controller 16 through the connectors 28 and 29. In response to this command, the controller 16 causes the switch 30 to shift to the side of the antenna 2. When the connectors 28 and 29 are connected to each other, therefore, the terminal equipment can be switched to the antenna 2 which is located in the vehicle M at the fine view place. This can improve the signal transmission and reception quality. Since the switching is automatically made, the user U does not have to make any operations to select one of the antennas 2 and 25.

It is now assumed that the connectors 28 and 29 are connected to each other and that the equipment is used in the cellular mode. Under such a condition, the switches 26, 27 and 30 are in connection with the sides of the modulator/demodulator 15, controller 16 and antenna 2, respectively. If the connectors 28 and 29 are disconnected from each other, it is detected by the controller 16. If one of the terminals defining the connector 29 has been grounded, the detection can be accomplished by detecting the open potential of a terminal of the connector 28 which corresponds to the grounded terminal of the connector 29. In response to this detection, the controller 16 shifts the switch 30 to the side of the antenna 25. Therefore, the antenna 25 can be selected by disconnecting the connectors 28 and 29 from each other. Since the switching is automatically carried out, the user U does not have to make any operations to activate the switch 30.

The fifth embodiment can also provide the same advantages as in the third embodiment.

(6) Sixth Embodiment

Figure 15:
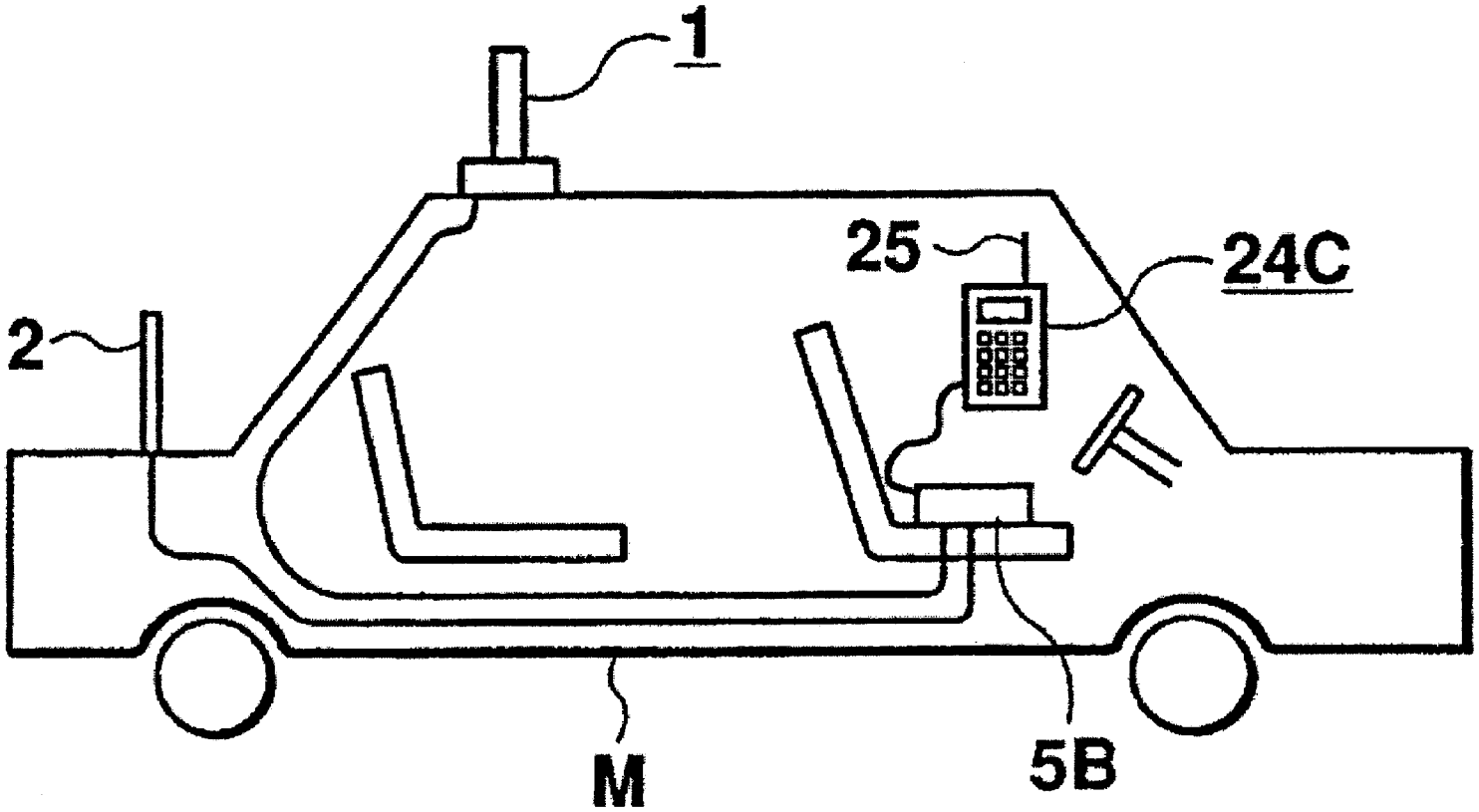
FIG. 15 is a conceptual view of a vehicle in which the sixth embodiment of a mobile communication terminal equipment constructed in accordance with the present invention is mounted, particularly showing the layout of units in this vehicle.
Figure 16:
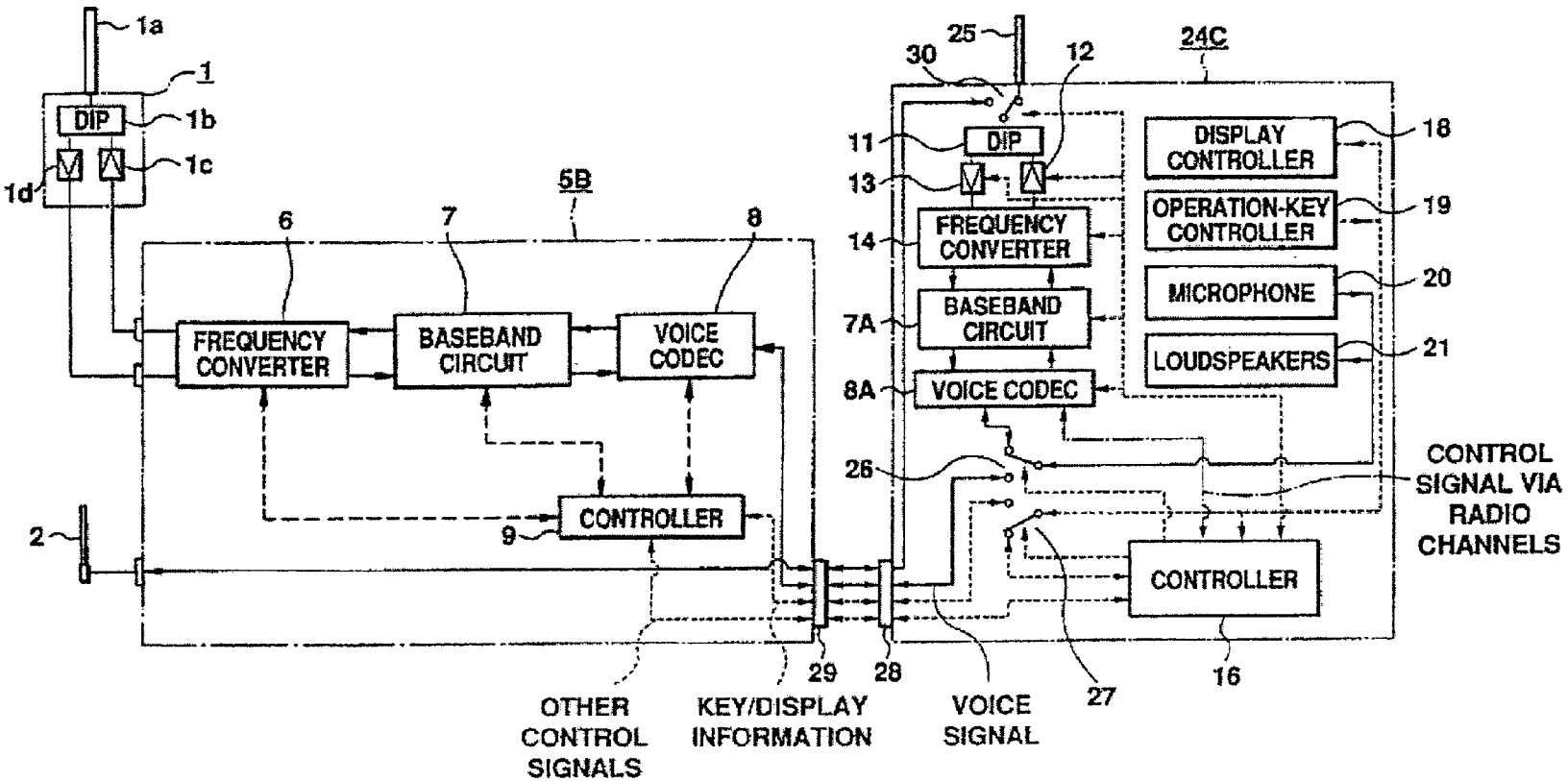
FIG. 16 is a block diagram of the mobile communication terminal equipment shown in FIG. 15, showing the flow of transmitted and received signals by solid lines and the flow of control signals by broken lines.
Figure 17:
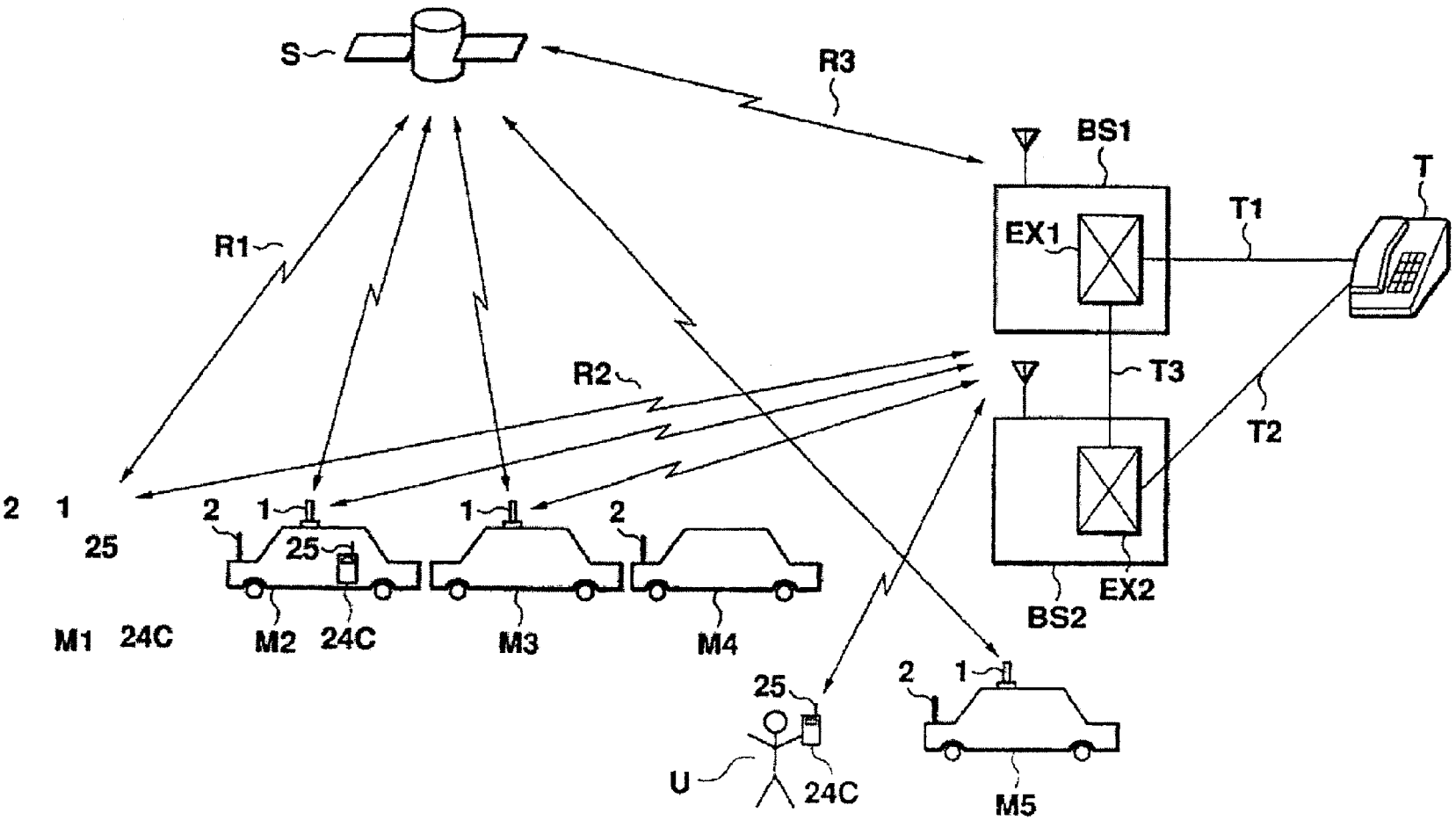
FIG. 17 is a system chart of an environment in which the mobile communication terminal equipment shown in FIG. 15 is used.
Figure 18:
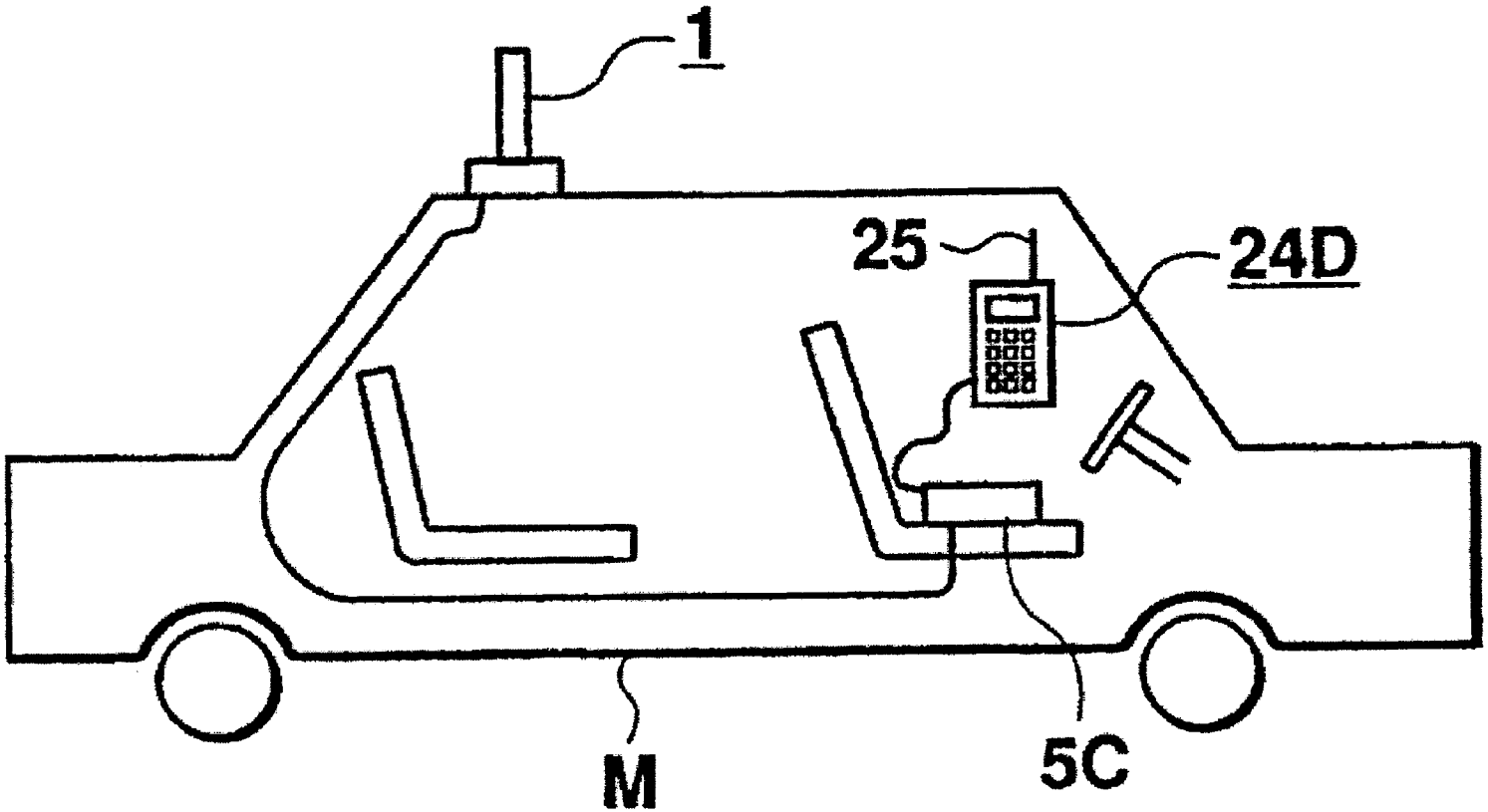
FIG. 18 is a conceptual view of a vehicle in which the seventh embodiment of a mobile communication terminal equipment constructed in accordance with the present invention is mounted, particularly showing the layout of units in this vehicle.
Figure 19:
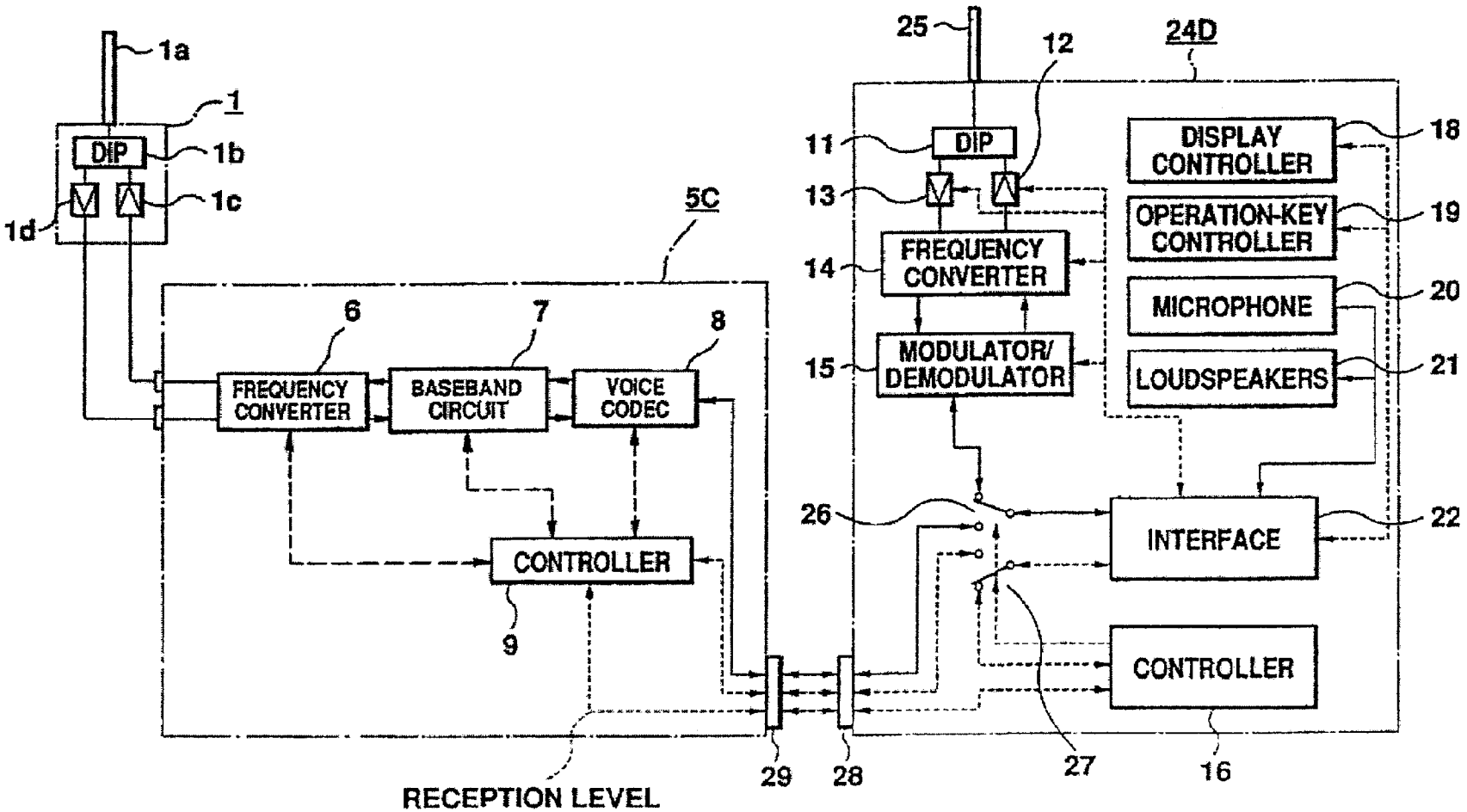
FIG. 19 is a block diagram of the mobile communication terminal equipment shown in FIG. 18, showing the flow of transmitted and received signals by solid lines and the flow of control signals by broken lines.
Figure 20:
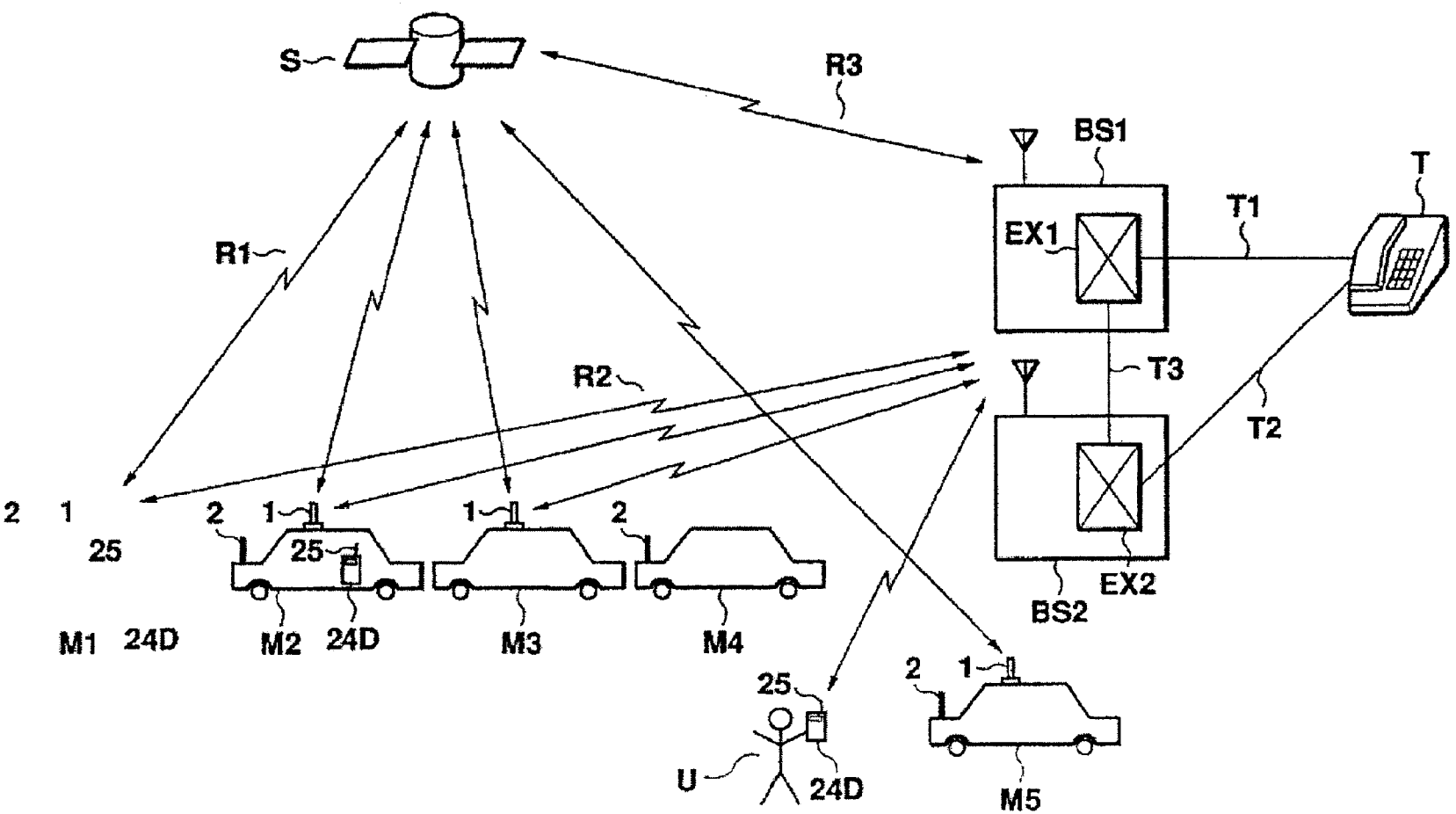
FIG. 20 is a system chart of an environment in which the mobile communication terminal equipment shown in FIG. 18 is used.

FIGS. 15–17 show the sixth embodiment of the present invention in which the hand set 24B of the fifth embodiment is replaced by a hand set 24C. The hand set 24C utilizes a base band circuit 7A and voice codec 8A in place of the modulator/demodulator 15. Therefore, the sixth embodiment can be applied to the digital cellular communication. The other components and advantages are similar to those of the fifth embodiment.

(7) Seventh Embodiment

FIGS. 18–21 show the seventh embodiment of the present invention which utilizes a hand set 24D having the functions of the controller 16 different from those of the hand set 24 in the third embodiment and also a transceiver 5C having the functions of the controller 9 different from those of the transceiver 5A in the third embodiment. The other components, functions and advantages are similar to those of the third embodiment.

The seventh embodiment is characterized by automatically performing the alternation between the satellite communication and the cellular system.

Figure 21:
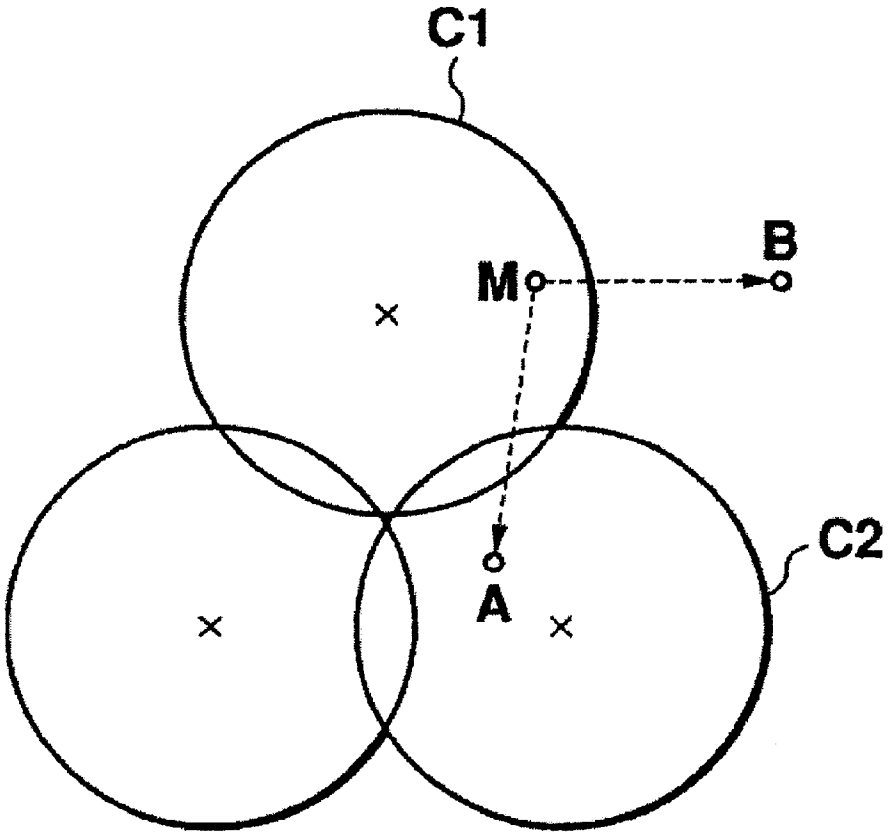
FIG. 21 is a view illustrating the hand-off or alternating between different systems, which is executed by the mobile communication terminal equipment shown in FIG. 18.

It is now assumed that the vehicle M moves from a cell C1 to a position A in another cell C2 in the cellular mode, as shown in FIG. 21. When it is wanted for the terminal equipment mounted in the vehicle M to continue the cellular communication, various controls including the switching of radio frequency depending on the movement of the vehicle M between the cells C1 and C2 and others must be carried out. This is called "hand-off" which is usually carried out in response to reduction of reception level or increase of error rate (see "EIA/TIA Project Number 2398", 2,4,5 Mobile Assisted Hand Off).

It is now assumed that in the cellular mode, the vehicle M moves to a position B out of the cell C1, the position B being also out of the service area in the cellular system, as shown in FIG. 21. Alternatively, it is assumed that when the first cellular system is being used, the vehicle M moves to the position B out of the cell C1, the position B being out of the service area in the first cellular system but within the service area of the second cellular system. In this case, the terminal equipment mounted in the vehicle M can continue the cellular communication only when it is shifted from the cellular system to the satellite communication system or from the first to the second cellular system. When the shift between different systems which are carried out by different service operators is performed without disconnection of the communication, it is called "alternating".

The controller 16 monitors the operation of a reception circuit from the amplifier 13 to the modulator/demodulator 15 in the cellular mode and detects a signal reception level. The controller 16 simultaneously receives signals from a plurality of base stations BS2 and compares these signals with one another. Thus, the controller 16 judges whether or not the maximum reception level throughout the base stations BS2 exceeds a predetermined level. If the maximum reception level is higher than the predetermined level, the controller 16 sends a control signal to the base station BS2 having the maximum reception level so that the cellular communication is continued via the base station ("hand-off"). If not so, the controller 16 judges that any communication with a signal quality better than the predetermined level cannot be carried out even by the use of the cellular system and informs the controller 9 of the reception level through the connectors 29 and 28. The controller 9 monitors the operations of the components of the transceiver 5C even in the cellular mode to detect the reception level or error rate. The controller 9 compares the reception level provided by the controller 16 with the reception level or error rate detected by the controller 9 itself. If the controller 9 judges that a better communication can be carried out by utilizing the satellite mode than by utilizing the cellular mode, it is reported to the controller 16 through the connectors 26 and 27. Thus, the controller 16 actuates the switches 26 and 27 to select the satellite mode. This realizes the alternating from the cellular system to the satellite communication system. If it is not judged that good communication can be carried out in the satellite mode, the cellular mode will be continued.

In such a manner, the seventh embodiment can automatically select and perform the hand-off in the cellular communication or the alternating between the satellite communication and the cellular communication. The usability of the terminal equipment can be improved.

(8) Eighth Embodiment

Figure 22:
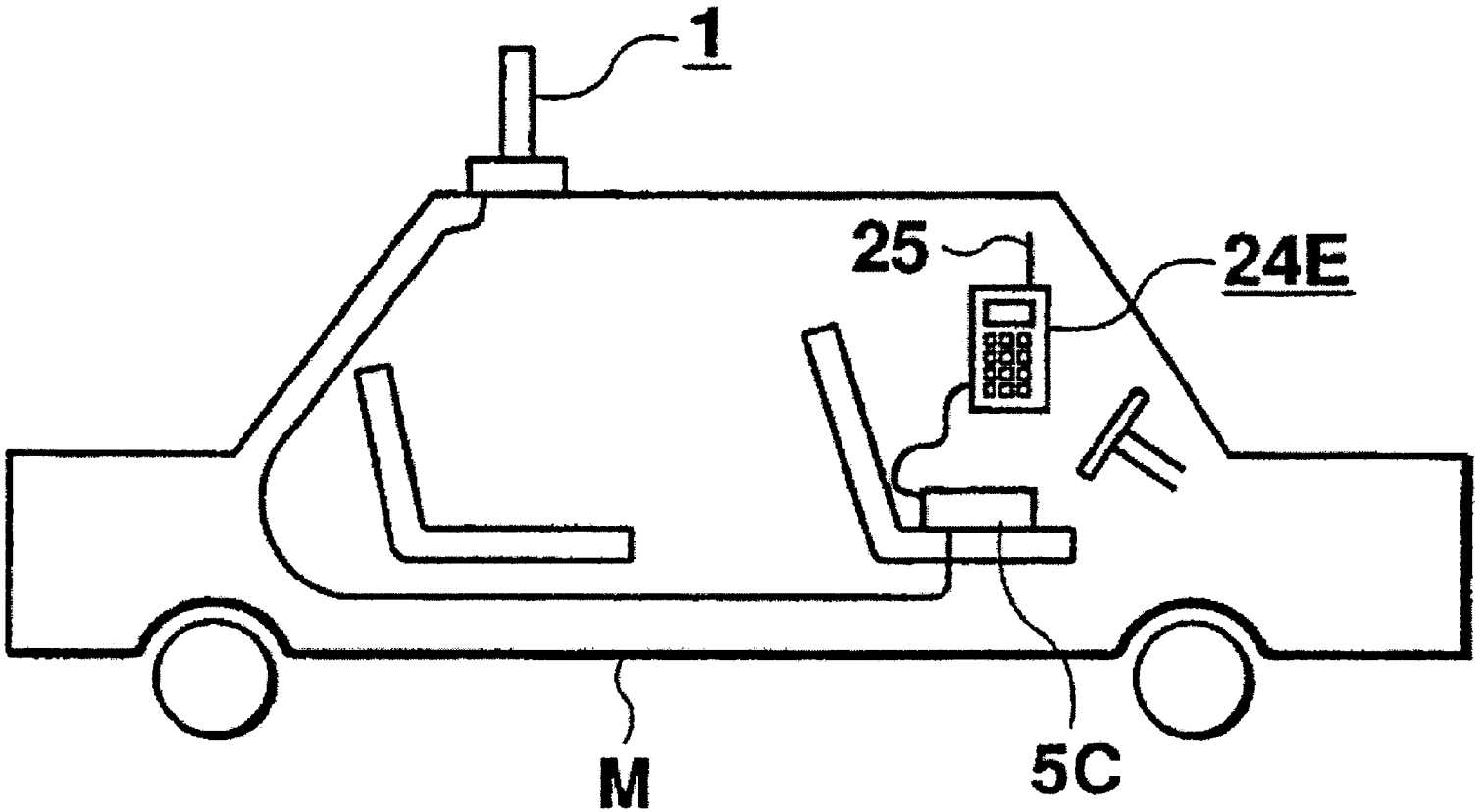
FIG. 22 is a conceptual view of a vehicle in which the eighth embodiment of a mobile communication terminal equipment constructed in accordance with the present invention is mounted, particularly showing the layout of units in this vehicle.
Figure 23:
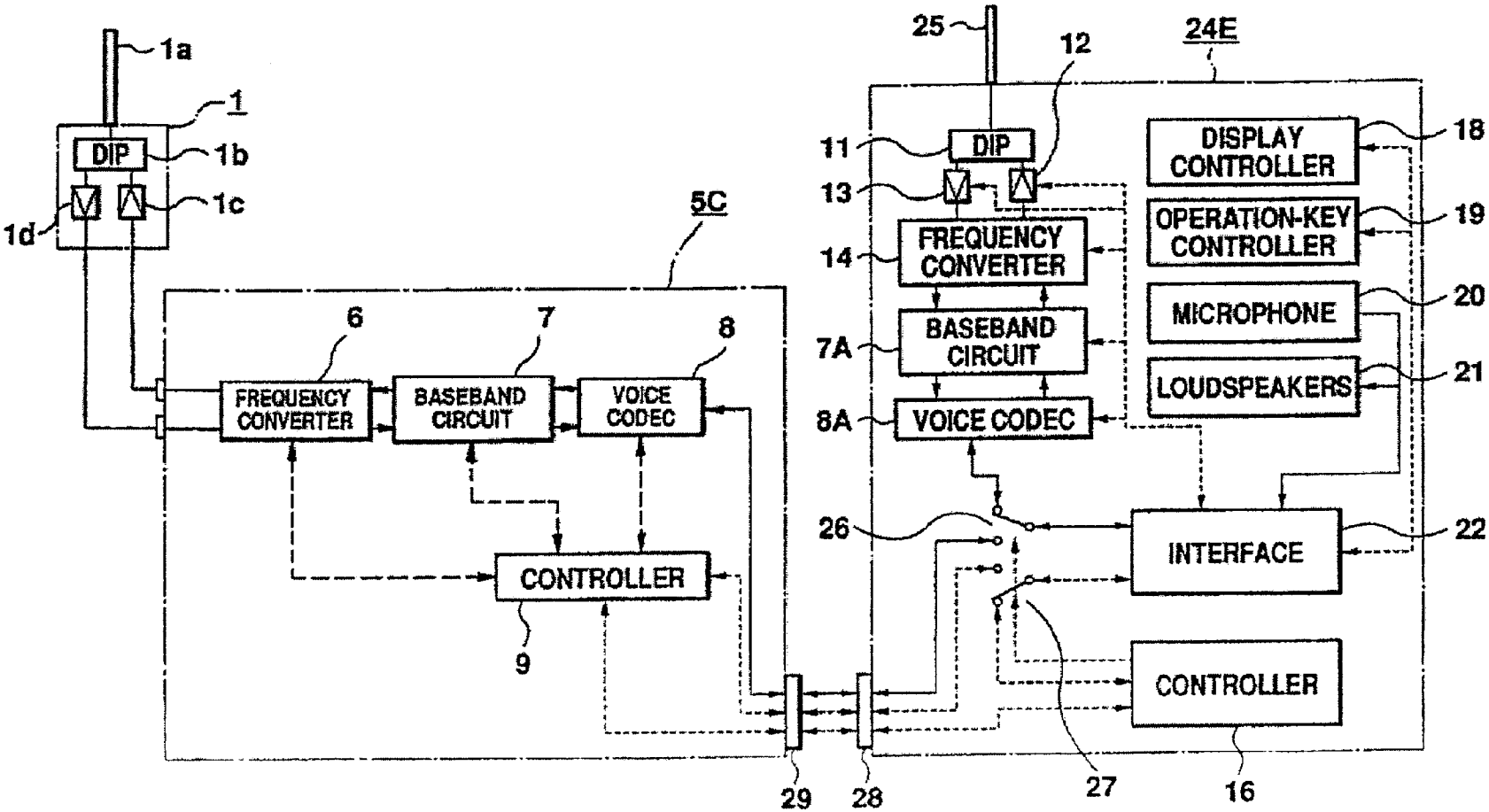
FIG. 23 is a block diagram of the mobile communication terminal equipment shown in FIG. 22, showing the flow of transmitted and received signals by solid lines and the flow of control signals by broken lines.
Figure 24:
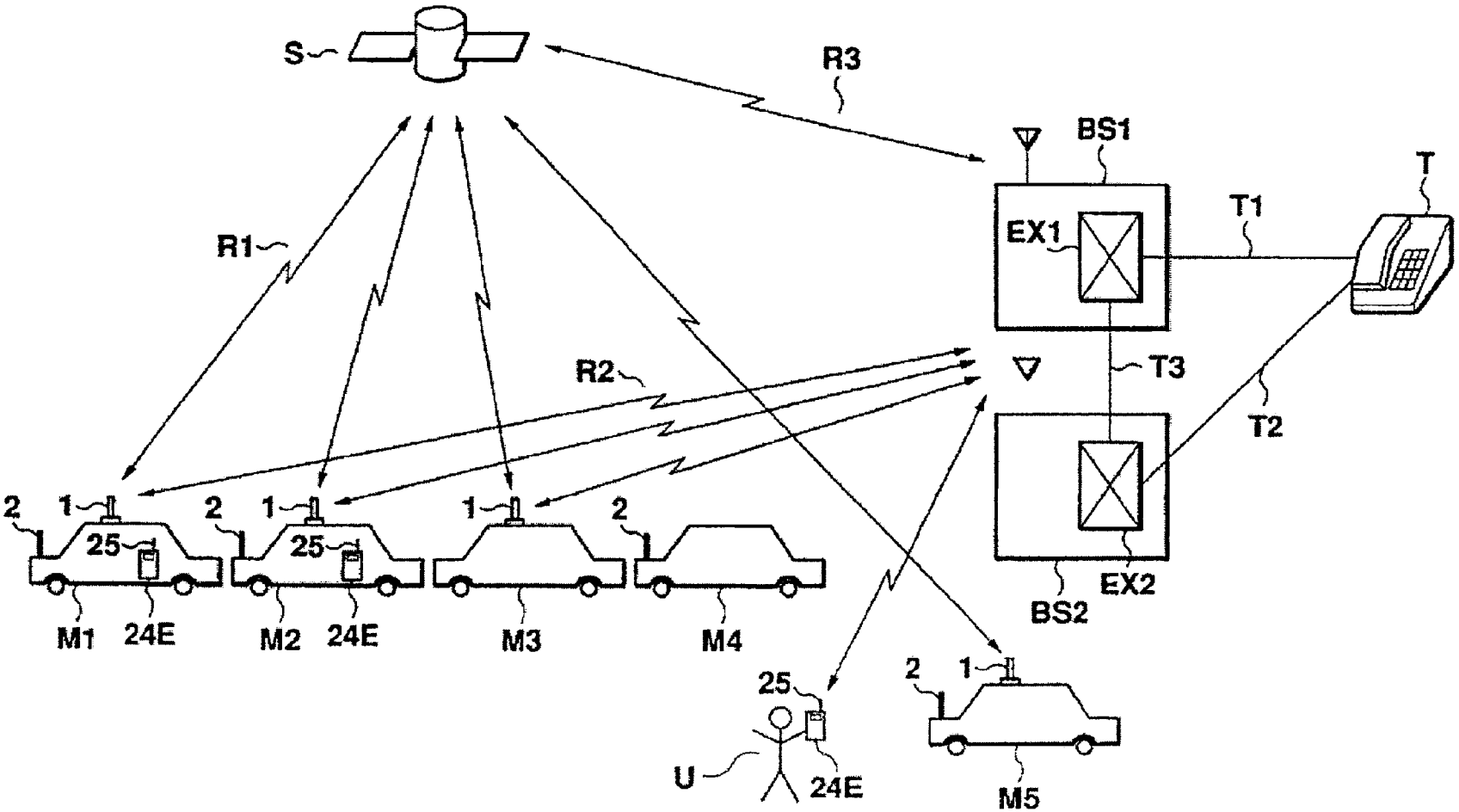
FIG. 24 is a system chart of an environment in which the mobile communication terminal equipment shown in FIG. 22 is used.

FIGS. 22–24 show the eighth embodiment of the present invention in which a hand set 24E is used in place of the hand set 24D of the seventh embodiment. The hand set 24E utilizes a base band circuit 7A and voice codec 8A in place of the modulator/demodulator 15. The controller 16 performs the hand-off in the cellular system and the alternating between a plurality of cellular systems by detecting and comparing the signal reception level or the error rate (number of error bits per unit amount of information). The controller 9 performs the alternating between the cellular system and the satellite communication by detecting the error rate in the transceiver 5C and comparing it with the signal reception level or the error rate in the cellular reception circuit. Therefore, the eighth embodiment can be applied to the digital cellular communication system. The other components and advantages are similar to those of the seventh embodiment.

We claim:

1. A mobile communication terminal equipment mountable in a vehicle comprising:

a satellite transceiver mountable in said vehicle and including a satellite transmission/reception circuit for transmitting and receiving signals through a satellite wireless communication system; and a portable set disconnectable from the satellite transceiver so that the set can be carried by a user, said portable set comprising:

a terrestrial transmission/reception circuit for transmitting and receiving signals through a terrestrial wireless communication system;

a signal input/output circuit for inputting signals from the user and for outputting signals to the user; and a connection controller and switching means for selectively connecting the signal input/output circuit to one of the satellite transceiver and terrestrial transmission/reception circuits when said portable set is connected to said satellite transceiver and for connecting said signal input/output circuit to said terrestrial transmission/reception circuit when said portable set is disconnected from said satellite transceiver, *wherein when said por-*

*table set is disconnected from said satellite transceiver, a user of said portable set may carry out terrestrial wireless communication immediately without the necessity of making any further reconnections of communication equipment components, and further wherein a size of said satellite transceiver is reduced by eliminating therefrom the need for any input/output device by virtue of said signal input/output circuit being provided in said portable set.*

2. A mobile communication terminal equipment as defined in claim 1 wherein the satellite transceiver further includes:

a satellite communication antenna fixedly mounted in the vehicle to perform a wireless transmission/reception of signal between the mobile communication terminal equipment and an artificial satellite, said satellite transmission/reception circuit supplying a signal to be transmitted to said satellite communication antenna and receiving a signal from said satellite communication antenna; and a satellite control means for causing a signal from said signal input/output circuit to be transmitted from said satellite communication antenna to the artificial satellite through the satellite transmission/reception circuit and for causing the satellite transmission/reception circuit to output a signal received by the satellite communication antenna from the artificial satellite to the signal input/output circuit as a signal to be outputted, when the satellite transmission/reception circuit is in connection with the signal input/output circuit.

3. A mobile communication terminal equipment as defined in claim 2 wherein said satellite transmission/reception circuit comprises:

transmission means for transmitting the signal from the signal input/output circuit by coding the input signal, by digitally modulating a transmitted signal using the coded signal as a modulation signal and by supplying the transmission signal to the satellite communication antenna; and reception means for digitally demodulating and decoding the signal received by the satellite communication antenna, wherein when the satellite transmission/reception circuit is in connection with the signal input/output circuit, said satellite control means causes the signal from the signal input/output circuit to be sent to the transmission means and also causes the reception means to send the signal decoded by the reception means to the signal input/output circuit as the signal to be outputted.

4. A mobile communication terminal equipment as defined in claim 1 wherein said portable set further includes:

a portable terrestrial communication antenna fixedly mounted in the portable set to perform a wireless signal transmission/reception between the mobile communication terminal equipment and a base station of the terrestrial wireless communication system, said terrestrial transmission/reception circuit supplying a signal to be transmitted to the portable terrestrial communication antenna and also receiving a signal from the portable communication antenna; and a terrestrial control means responsive to the connection of the terrestrial transmission/reception circuit with the signal input/output circuit for causing a signal from the signal input/output circuit to be transmitted from the portable terrestrial communication antenna to the base station through the terrestrial transmission/reception circuit and for causing the signal received by the portable terrestrial communication antenna to be supplied to the signal input/output circuit through the terrestrial transmission/reception circuit as a signal to be outputted.

5. A mobile communication terminal equipment as defined in claim 4 wherein said terrestrial transmission/reception circuit comprises:

transmission means for transmitting the signal from the signal input/output circuit by coding the signal, by digitally modulating a transmitted signal using the coded signal as a modulation signal and by supplying the transmission signal to the portable terrestrial communication antenna; and reception means for digitally demodulating and decoding the signal received by the portable terrestrial communication antenna, wherein when the terrestrial transmission/reception circuit is in connection with the signal input/output circuit, said terrestrial control means causes the signal from the signal input/output circuit to be sent to the transmission means and also causes the reception means to send the decoded signal to the signal input/output circuit as the signal to be outputted.

6. A mobile communication terminal equipment as defined in claim 4 wherein said terrestrial transmission/reception circuit comprises:

transmission means for transmitting the signal from the signal input/output circuit by analog modulating a transmission signal using the signal from the signal input/output circuit as a modulation signal and by supplying the transmission signal to the portable terrestrial communication antenna; and reception means for analog demodulating the signal received by the portable terrestrial communication antenna, wherein when the terrestrial transmission/reception circuit is in connection with the signal input/output circuit, said terrestrial control means causes the signal from the signal input/output circuit to be sent to the transmission means and also causes the reception means to send the demodulated signal to the signal input/output circuit as the signal to be outputted.

7. A mobile communication terminal equipment as defined in claim 1:

wherein the satellite transceiver further includes a stationary terrestrial communication antenna fixedly mounted in the vehicle to perform a wireless signal transmission/reception between the mobile communication terminal equipment and a base station to the terrestrial wireless communication system; and wherein said portable set further includes:

a portable terrestrial communication antenna fixedly mounted in the portable machine to perform a wireless signal transmission/reception between the mobile communication terminal equipment and the base station of the terrestrial wireless communication system;

an antenna connection switching means for selectively connecting one of the stationary and portable terrestrial communication antennas to the terrestrial transmission/reception circuit, the terrestrial transmission/reception circuit supplying a signal to be transmitted to the selected one of the stationary and portable terrestrial communication antennas and receiving a signal from the selected one of the stationary and portable terrestrial communication antennas; and terrestrial control means responsive to the connection of said terrestrial transmission/reception circuit with the signal input/output circuit and stationary terrestrial communication antenna for causing a signal from the signal input/output circuit to be transmitted from the stationary terrestrial communication antenna to the base station through the terrestrial transmission/reception circuit and for causing a signal received by the stationary terrestrial communication antenna to be supplied to the signal input/output circuit through the terrestrial transmission/reception circuit as a signal to be outputted, said terrestrial control means responsive to the connection of the terrestrial transmission/reception circuit with the signal input/output circuit and portable terrestrial communication antenna for causing the signal from the signal input/output circuit to be transmitted from the portable terrestrial communication antenna to the base station through the terrestrial transmission/reception circuit and for causing a signal received by the portable terrestrial communication antenna to be sent to the signal input/output circuit through the terrestrial transmission/reception circuit as the signal to be outputted.

8. A mobile communication terminal equipment as defined in claim 7 wherein said antenna connection switching means includes an antenna selection switch responsive to a command from the terrestrial control means for selectively connecting one of said stationary and portable terrestrial communication antennas with the terrestrial transmission/reception circuit.

9. A mobile communication terminal equipment as defined in claim 7 wherein said terrestrial transmission/reception circuit comprises:

transmission means for transmitting the signal from the signal input/output circuit by coding the supplied signal, by digitally modulating a transmission signal using the coded signal as a modulation signal and by supplying the transmission signal to the selected one of the stationary and portable terrestrial communication antenna; and reception means for digitally demodulating and decoding the signal received by the selected one of the stationary and portable terrestrial communication antennas, wherein when the terrestrial transmission/reception circuit is in connection with the signal input/output circuit, said terrestrial control means causes the signal from the signal input/output circuit to be sent to the transmission means and also causes the reception means to send the decoded signal to the signal input/output circuit as the signal to be outputted.

10. A mobile communication terminal equipment as defined in claim 7 wherein said terrestrial transmission/reception circuit comprises:

transmission means for transmitting the signal from the signal input/output circuit by analog modulating a transmission signal using the signal from the signal input/output circuit as a modulation signal and by supplying the transmission signal to the selected one of the stationary and portable terrestrial communication antennas; and reception means for demodulating the signal received by the selected one of the stationary and portable terrestrial communication antennas into an analog signal, wherein when the satellite transmission/reception circuit is in connection with the signal input/output circuit, said terrestrial control means causes the signal from the signal input/output circuit to be sent to the transmission means and also causes the reception means to send the demodulated signal to the signal input/output circuit as the signal to be outputted.

11. A mobile communication terminal equipment as defined in claim 7 wherein said satellite transceiver further includes:

a satellite communication antenna fixedly mounted on the vehicle to perform a wireless signal transmission/reception between the mobile communication terminal equipment and an artificial satellite, said satellite transmission/reception circuit supplying the signal to be transmitted to the satellite communication antenna and receiving a signal from the satellite communication antenna; and satellite control means responsive to the connection of the satellite transmission/reception circuit with the signal input/output for causing the signal from the signal input/output circuit to be transmitted from the satellite communication antenna to the artificial satellite through the satellite transmission/reception circuit and for causing a signal received by the satellite communication antenna from the artificial satellite to be sent to the signal input/output circuit through the satellite transmission/reception circuit as the signal to be outputted, said satellite control means providing a signal indicative of the connection between the satellite transceiver and the portable set to the satellite control means, wherein said terrestrial control means responsive to the absence of the signal from the satellite control means indicative of the connection between the satellite transceiver and the portable machine for controlling the antenna connection switching means to connect the portable terrestrial communication antenna with the signal input/output circuit, said terrestrial control means further responsive to both the connections between the signal input/output circuit and the terrestrial transmission/reception circuit and between the satellite transceiver and the portable set for controlling the antenna connection switching means to connect the stationary terrestrial communication antenna with the signal input/output circuit.

12. A mobile communication terminal equipment as defined in claim 1;

wherein the satellite transceiver includes a satellite control means for monitoring the signal reception state at the satellite transmission/reception circuit;

wherein the portable set further includes a terrestrial control means for monitoring the signal reception state at the terrestrial transmission/reception circuit and for reporting, to the satellite control means, when the portable set is in connection with the satellite transceiver; and wherein said satellite control means judges the signal reception state of the satellite transmission/reception circuit and the signal reception state of the terrestrial transmission/reception circuit reported from the terrestrial control means by comparing with a predetermined reference condition, the satellite control means controls the connection switching means solely or in cooperation with the terrestrial control means to connect the terrestrial transmission/reception circuit with the signal input/output circuit when said satellite control means judges that the signal reception state of the terrestrial transmission/reception circuit is sufficient to continue a signal reception at the terrestrial transmission/reception circuit, said satellite control means further controls the connection switching means solely or in cooperation with the terrestrial control means to connect the satellite transmission/reception circuit with the signal input/output circuit when the signal reception state of the terrestrial transmission/reception circuit is not sufficient to continue the signal reception at the terrestrial transmission/reception circuit and a relatively good communication can be attained by executing a signal reception at the satellite transmission/reception circuit.

13. A mobile communication terminal equipment as defined in claim 12 wherein said predetermined reference conditions are reference reception levels set for respective ones of the signal reception states at the satellite and terrestrial transmission/reception circuits or reference error rates set for respective ones of the signal reception states at the satellite and terrestrial transmission/reception circuits.

14. A mobile communication terminal equipment as defined in claim 1 wherein said signal input/output circuit includes a microphone for receiving voice signals from the user with voice and a loudspeaker for outputting signals from the user as sound.

15. A mobile communication terminal equipment as defined in claim 1;

wherein said satellite transceiver includes satellite control means for controlling the signal transmission/reception at the satellite transmission/reception circuit, wherein said terrestrial transmission/reception circuit includes terrestrial control means for controlling the signal transmission/reception at the terrestrial transmission/reception circuit, wherein said signal input/output circuit further includes command input means for inputting a user's command relating the operation of at least one of said satellite transmission/reception circuit, said terrestrial transmission/reception circuit and said connection switching means, and display control means for displaying at least one of the operational state of said terrestrial transmission/reception circuit, the signal transmission/reception state of said satellite transmission/reception circuit, the operational state of said terrestrial transmission/reception circuit, the signal transmission/reception state of said terrestrial the signal transmission/reception circuit, the operational state of said connection switching means and the signal input/output state of said signal input/output circuit;

wherein said signal input/output circuit is controlled by the satellite control means when the satellite transmission/reception circuit is connected to the signal input/output circuit and by the terrestrial control means when the terrestrial transmission/reception circuit is connected to the signal input/output circuit; and wherein control signals are transmitted and received between the satellite control means, the terrestrial control means and the signal input/output circuit, said control signals including information which is indicative at least one of the signal reception state of the satellite transmission/reception circuit, the signal reception state of the terrestrial transmission/reception circuit, the operational state of the connection switching means and a command from the command input means.

16. A mobile communication terminal equipment as defined in claim 15 wherein said command input means inputs the command from operating key means operable by the user.

17. A mobile communication terminal equipment as defined in claim 15;

wherein said connecting switching means includes a first switch for selectively supplying a signal from the signal input/output circuit to one of said satellite and terrestrial transmission/reception circuits and for selectively supplying a signal from one of said satellite and terrestrial transmission/reception circuits to the signal input/output circuit as a signal to be outputted and a second switch for switching a control signal path between a first channel for connecting the satellite control means to the signal input/output circuit and a second channel for connecting the terrestrial control means to the signal input/output circuit; wherein the user's commands through the command input means includes a switching command indicative of which one of said satellite and terrestrial transmission/reception circuits should be connected with the signal input/output circuit, the terrestrial control means for controlling the first and second switches to connect the satellite transmission/reception circuit with the signal input/output circuit when the switching command indicates that the satellite transmission/reception circuit should be connected to the signal input/output circuit and also for controlling the first and second switches to connect the terrestrial transmission/reception circuit with the signal input/output circuit when the switching command indicates that the terrestrial transmission/reception circuit should be connected to the signal input/output circuit.

18. A mobile communication terminal equipment as defined in claim 17;

wherein the satellite transceiver and portable set include connectors electrically connectable/disconnectable with each other; and wherein when the connector in the satellite transceiver is electrically connected to the connector in the portable set, the mobile communication terminal equipment selectively executes one of the communications through the satellite and terrestrial wireless communication systems, and when the connector in the satellite transceiver is electrically disconnected from the connector in the portable machine, the mobile communication terminal equipment executes the communication through the terrestrial wireless communication system.

*19. A mobile communication terminal equipment comprising:*

*a satellite transceiver including a satellite transmission/reception circuit for transmitting and receiving signals through a satellite wireless communication system; and*

*a portable set disconnectable from the satellite transceiver and including*

*a terrestrial transmission/reception circuit for transmitting and receiving signals through a terrestrial wireless communication system,*

*a signal input/output circuit for inputting signals from the user and for outputting signals to the user, and*

*a connection controller and switching means for selectively connecting the signal input/output circuit to one of the satellite transceiver and terrestrial transmission/reception circuits when said portable set is connected to said satellite transceiver and for connecting said signal input/output circuit to said terrestrial transmission/reception circuit when said portable set is disconnected from said satellite transceiver, wherein when said portable set is disconnected from said satellite transceiver, a user of said portable set may carry out terrestrial wireless communication immediately without the necessity of making any further reconnections of communication equipment components, and further wherein a size of said satellite transceiver is reduced by eliminating therefrom the need for any input/output device by virtue of said signal input/output circuit being provided in said portable set.*

*20. A mobile communication terminal equipment as defined in claim 19,*

*wherein said satellite transceiver further includes satellite control means for controlling the signal transmission/reception at the satellite transmission/reception circuit,*

*wherein said portable set further includes terrestrial control means for controlling the signal transmission/reception at the terrestrial transmission/reception circuit, and*

*wherein said signal input/output circuit is controlled by the satellite control means when the satellite transmission/reception circuit is connected to the signal input/output circuit, and controlled by the terrestrial control means when the terrestrial transmission/reception circuit is connected to the signal input/output circuit.*

*21. A mobile communication terminal equipment as defined in claim 20,*

*wherein said connection controller includes command input means for inputting a user's command relating the operation of said switching means, and*

*wherein control signals are transmitted and received between the satellite control means, the terrestrial control means and the command input means, said control signals including information which is indicative at least one of the signal reception state of the satellite transmission/reception circuit, the signal reception state of the terrestrial transmission/reception circuit, the operational state of the switching means, and a command from the command input means.*

*22. A mobile communication terminal equipment as defined in claim 20,*

*wherein said connection controller includes command input means for inputting a user's command for changing over the switching means, the user's command from the command input means is inputted into the satellite control means and the satellite control means instructs the terrestrial control means the changing-over when the satellite transmission/reception circuit is connected to the signal input/output circuit, and inputted into the terrestrial control means when the terrestrial transmission/reception circuit is connected to the signal input/output circuit, and*

*wherein the terrestrial control means controls the switching means in response to an instruction by the satellite control means when the satellite transmission/reception circuit is connected to the signal input/output circuit, and controls the switching means in response to the user's command from the command input means when the terrestrial transmission/reception circuit is connected to the signal input/output circuit.*

*23. A mobile communication terminal equipment comprising:*

*a satellite transceiver including a satellite transmission/reception circuit for transmitting and receiving signals through a satellite wireless communication system; and*

*a portable set disconnectable from the satellite transceiver and including*

*a terrestrial transmission/reception circuit for transmitting and receiving signals through a terrestrial wireless communication system,*

*a signal input/output circuit for inputting signals from the user and for outputting signals to the user, and*

*a connection controller and switch for selectively connecting the signal input/output circuit to one of the satellite transceiver and terrestrial transmission/reception circuits when said portable set is connected to said satellite transceiver and for connecting said signal input/output circuit to said terrestrial transmission/reception circuit when said portable set is disconnected from said satellite transceiver, wherein when said portable set is disconnected from said satellite transceiver, a user of said portable set may carry out terrestrial wireless communication immediately without the necessity of making any further reconnections of communication equipment components, and further wherein a size of said satellite transceiver is reduced by eliminating therefrom the need for any input/output device by virtue of said signal input/output circuit being provided in said portable set.*

*24. A mobile communication terminal equipment as defined in claim 23,*

*wherein said satellite transceiver further includes a satellite controller for controlling the signal transmission/reception at the satellite transmission/reception circuit,*

*wherein said portable set further includes a terrestrial controller for controlling the signal transmission/reception at the terrestrial transmission/reception circuit, and wherein said signal input/output circuit is controlled by the satellite controller when the satellite transmission/reception circuit is connected to the signal input/output circuit, and controlled by the terrestrial controller when the terrestrial transmission/reception circuit is connected to the signal input/output circuit.*

*25. A mobile communication terminal equipment as defined in claim 24,*

*wherein said connection controller includes command input means for inputting a user's command relating the operation of said switch, and*

*wherein control signals are transmitted and received between the satellite controller, the terrestrial controller and the command input means, said control signals including information which is indicative at least one of the signal reception state of the satellite transmission/reception circuit, the signal reception state of the terrestrial transmission/reception circuit, the operational state of the switch, and a command from the command input means.*

*26. A mobile communication terminal equipment as defined in claim 24,*

*wherein said connection controller includes command input means for inputting a user's command for changing over the switch, the user's command from the command input means is inputted into the satellite controller and the satellite controller instructs the terrestrial controller the changing-over when the satellite transmission/reception circuit is connected to the signal input/output circuit, and inputted into the terrestrial controller when the terrestrial transmission/reception circuit is connected to the signal input/output circuit, and*

*wherein the terrestrial controller controls the switch in response to an instruction by the satellite controller when the satellite transmission/reception circuit is connected to the signal input/output circuit, and controls the switch in response to the user's command from the command input means when the terrestrial transmission/reception circuit is connected to the signal input/output circuit.*

* * * * *